United States Patent [19]

Rubinson et al.

[11] 4,449,182

[45] May 15, 1984

[54] INTERFACE BETWEEN A PAIR OF PROCESSORS, SUCH AS HOST AND PERIPHERAL-CONTROLLING PROCESSORS IN DATA PROCESSING SYSTEMS

[75] Inventors: Barry L. Rubinson; Edward A. Gardner; William A. Grace; Richard F. Lary; Dale R. Keck, all of Colorado Springs, Colo.

[73] Assignee: Digital Equipment Corporation, Maynard, Mass.

[21] Appl. No.: 308,826

[22] Filed: Oct. 5, 1981

[51] Int. Cl.³ .................... G06F 9/46; G06F 15/16
[52] U.S. Cl. .................................................. 364/200
[58] Field of Search ... 364/200 MS File, 900 MS File; 371/21

[56] References Cited

U.S. PATENT DOCUMENTS

| | | | |
|---|---|---|---|
| 3,940,601 | 2/1976 | Henry et al. | 235/153 AC |
| 4,145,739 | 3/1979 | Dunning et al. | 364/200 |
| 4,153,934 | 5/1979 | Sato | 364/200 |
| 4,181,937 | 1/1980 | Hattori et al. | 364/200 |
| 4,195,351 | 3/1980 | Barner et al. | 364/900 |
| 4,204,251 | 5/1980 | Brudevold | 364/200 |
| 4,212,057 | 7/1980 | Devlin et al. | 364/200 |
| 4,214,305 | 7/1980 | Tokita et al. | 364/200 |
| 4,237,534 | 12/1980 | Felix | 364/200 |
| 4,268,907 | 5/1981 | Porter et al. | 364/200 |
| 4,282,572 | 8/1981 | Moore et al. | 364/200 |
| 4,318,174 | 3/1982 | Suzuki et al. | 364/200 |
| 4,334,305 | 6/1982 | Girardi | 364/200 |

Primary Examiner—Joseph F. Ruggiero
Assistant Examiner—Gary V. Harkcom
Attorney, Agent, or Firm—Cesari and McKenna

[57] ABSTRACT

An interface mechanism (10) between two processors, such as a host processor (70) and a processor (31) in an intelligent controller (30) for mass storage devices (40), and utilizing a set of data structures employing a dedicated communications region (80A) in host memory (80). Interprocessor commands and responses are communicated as packets over an I/O bus (60) of the host (70), to and from the communication region (80A), through a pair of ring-type queues (80D) and (80E). The entry of each ring location (e.g., 132, 134, 136, 138) points to another location in the communications region where a command or response is placed. The filling and emptying of ring entries (132–138) is controlled through the use of an 'ownership' byte or bit (278) associated with each entry. The ownership bit (278) is placed in a first state when the message source (70 or 31) has filled the entry and in a second state when the entry has been emptied. Each processor keeps track of the rings' status, to prevent the sending of more messages than the rings can hold. These rings permit each processor to operate at its own speed, without creating race conditions and obviate the need for hardware interlock capability on the I/O bus (60).

21 Claims, 19 Drawing Figures

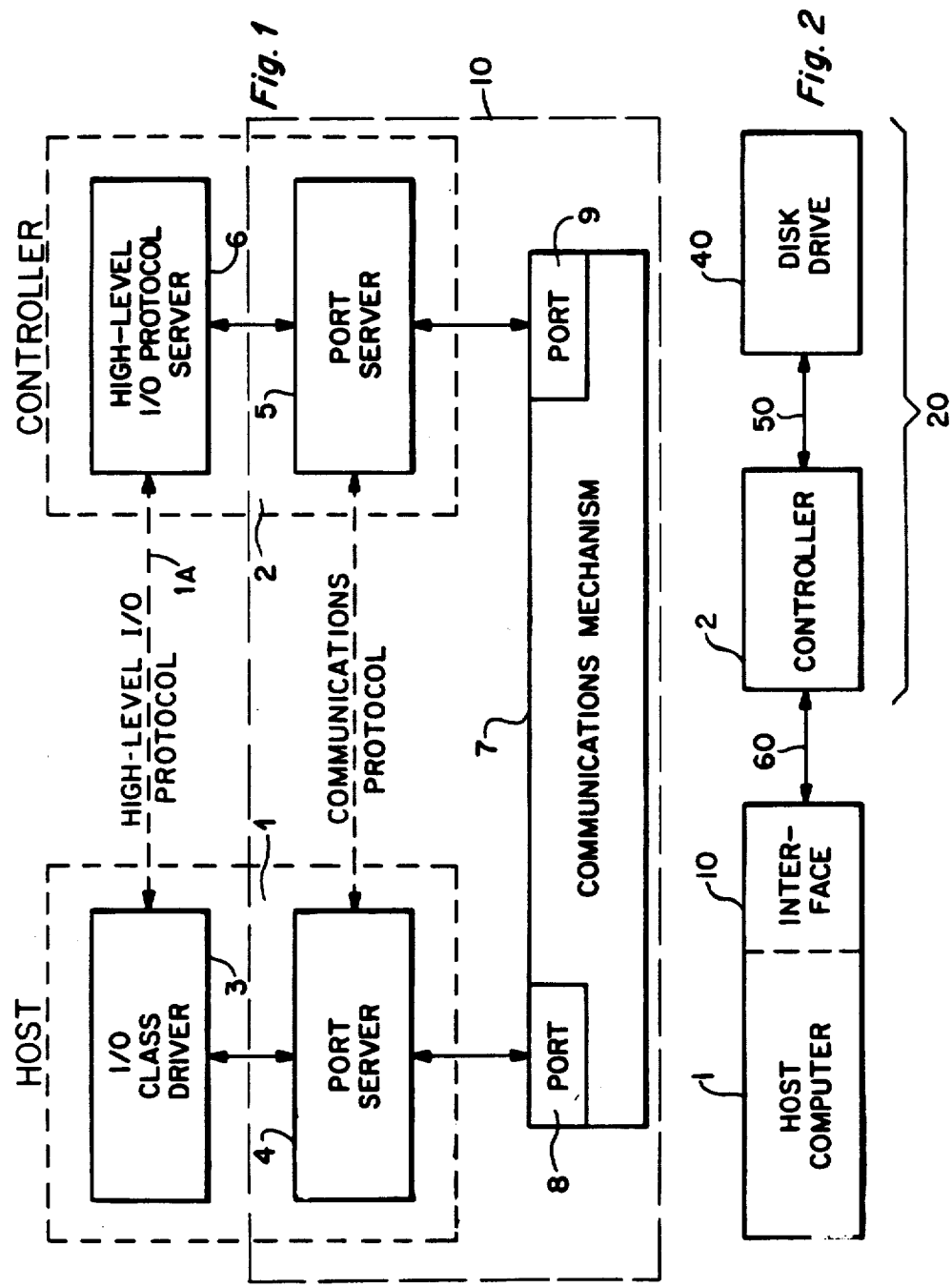

INTERFACE BETWEEN A PAIR OF PROCESSORS, SUCH AS HOST AND PERIPHERAL-CONTROLLING PROCESSORS IN DATA PROCESSING SYSTEMS

CROSS-REFERENCE TO RELATED APPLICATIONS

This application relates to a data processing system, other aspects of which are described in the following commonly assigned applications filed on even date herewith, the disclosures of which are incorporated by reference herein to clarify the environment, intended use and explanation of the present invention:

Ser. No. 308,771, titled Disk Format for Secondary Storage System and Ser. No. 308,593, titled Secondary Storage Facility Employing Serial Communication Between Drive and Controller.

FIELD OF THE INVENTION

This invention relates to the field of data processing systems and, in particular to an interface between a host processor and a controlling processor for a storage facility or other peripheral device or subsystem in such systems.

BACKGROUND OF THE INVENTION

In data processing systems utilizing secondary storage facilities, communication between the host processor, or main frame, and secondary storage facilities has a considerable impact on system performance. Secondary storage facilities comprise elements which are not an integral part of a central processing unit and its random access memory element (i.e., together termed the host), but which are directly connected to and controlled by the central processing unit or other elements in the system. These facilities are also known as "mass storage" elements or subsystems and include, among other possibilities, disk-type or tape-type memory units (also called drives).

In modern data processing systems, a secondary storage facility includes a controller and one or more drives connected thereto. The controller operates in response to signals from the host, usually on an input/output bus which connects together various elements in the system including the central processing unit. A drive contains the recording medium (e.g., a rotating magnetic disk), the mechanism for moving the medium, and electronic circuitry to read data from or store data on the medium and also to convert the data transferred between the medium and the controller to and from the proper format.

The controller appears to the rest of the system as simply an element on the input/output bus. It receives commands over the bus; these commands include information about the operation to be performed, the drive to be used, the size of the transfer and perhaps the starting address on the drive for the transfer and the starting address on some other system element, such as the random access memory unit of the host. The controller converts all this command information into the necessary signals to effect the transfer between the appropriate drive and other system elements. During the transfer itself, the controller routes the data to or from the appropriate drive and to or from the input/output bus or a memory bus.

Controllers have been constructed with varying levels of intelligence. Basically, the more intelligent the controller, the less detailed the commands which the central processing unit must issue to it and the less dependent the controller is on the host CPU for step-by-step instructions. Typically, controllers communicate with a host CPU at least partially by means of an interrupt mechanism. That is, when one of a predetermined number of significant events occurs, the controller generates an interrupt request signal which the host sees a short time later; in response, the host stops what it is doing and conducts some dialogue with the controller to service the controller's operation. Every interrupt request signal generated by the controller gives rise to a delay in the operation of the central processor. It is an object of the present invention to reduce that delay by reducing the frequency and number of interrupt requests.

When an intelligent controller is employed, a further problem is to interlock or synchronize the operation of the processor in the controller with the operation of the processor in the host, so that in sending commands and responses back and forth, the proper sequence of operation is maintained, race conditions are avoided, etc. Normally this is accomplished by using a communications mechanism (i.e., bus) which is provided with a hardware interlock capability, so that each processor can prevent the other from transmitting out of turn or at the wrong time.

Modern controllers for secondary storage facilities are usually so-called "intelligent" devices, containing one or more processors of their own, allowing them to perform sophisticated tasks with some degree of independence. Sometimes, a processor and a controller will share a resource with another processor, such as the host's central processor unit. One resource which may be shared is a memory unit.

It is well known that when two independent processors share a common resource (such as a memory through which the processors and the processes they execute may communicate with each other), the operation of the two processors (i.e., the execution of processes or tasks by them) must be "interlocked" or "synchronized," so that in accessing the shared resource, a defined sequence of operations is maintained and so-called "race" conditions are avoided. That is, once a first processor starts using the shared resource, no other processor may be allowed to access that resource until the first processor has finished operating upon it. Operations which otherwise might have occurred concurrently must be constrained to take place seriatim, in sequence. Otherwise, information may be lost, a processor may act upon erroneous information, and system operation will be unreliable. To prevent this from happening, the communications mechanism (i.e., bus) which links together the processors and a shared resource typically is provided with a hardware "interlock" or synchronization capability, by means of which each processor is prevented from operating on the shared resource in other than a predefined sequence.

In the prior art, three interlock mechanisms are widely known for synchronizing processors within an operating system, to avoid race conditions. One author calls these mechanisms (1) the test-and-set instruction mechanism, (2) the wait and signal mechanism and (3) the P and V operations mechanism. S. Madnick and J. Donovan, *Operating Systems,* 4-5.2 at 251-55 (McGraw Hill, Inc., 1974). That text is hereby incorporated by reference for a description and discussion of those mechanisms. Another author refers to three techniques for insuring correct synchronization when multiple processors communicate through a shared memory as (1) process synchronization by semaphores, (2) process synchronization by monitors and (3) process synchronization by monitors without mutual exclusion. C. Weitzman, *Distributed Micro/Mini Computer Systems: Structure, Implementation and Application*, 3.2 at 103-14 (Prentice Hall, Inc., 1980). That text is hereby incorporated by reference for a description and discussion of those techniques. When applied to multiple processors which communicate with a shared resource by a bus, such mechanisms impose limitations on bus characteristics; they require, for example, that certain compound bus operations be indivisible, such as an operation which can both test and set a so-called "semaphore" or monitor without being interrupted while doing so. These become part of the bus description and specifications.

If the testing of a semaphore were done during one bus cycle and the setting during a different bus cycle, two or more processors which want to use a shared resource might test its semaphore at nearly the same time. If the semaphore is not set, the processors all will see the shared resource as available. They will then try to access it; but only one can succeed in setting the semaphore and getting access; each of the other processors, though, having already tested and found the resource available, would go through the motions of setting the semaphore and reading or writing data without knowing it had not succeeded in setting the semaphore and accessing the resource. The data thus read will be erroneous and the data thus written could be lost.

Not all buses, though, are designed to allow implementation of such indivisible operations, since some buses were not designed with the idea of connecting multiple processors via shared resources. Consequently, such buses are not or have not been provided with hardware interlock mechanisms.

When a bus does not have such a capability, resort frequently has been made to use of processor interrupts to control the secondary storage facility, or some combination of semaphores and interrupts (as in the Carnegie-Mellon University C.mpp multi-minicomputer system described at pages 27-29 and 110-111 of the above-identified book by Weitzman), but those approaches have their drawbacks. If multiple processors on such a bus operate at different rates and have different operations to perform, at least one processor frequently may have to wait for the other. This aggrevates the slow-down in processing already inherent in the use of interrupt control with a single processor.

A further characteristic of prior secondary storage facilities is that when a host initially connects to a controller, it usually assumes, but cannot verify, that the controller is operating correctly.

Therefore, it is an object of this invention to improve the operation of a secondary storage facility including a controller and a drive.

A further object of this invention is to provide such a facility with an improved method for handling host-controller communications over a bus lacking a hardware interlock capability, whereby the processor in the host and controller can operate at different rates with minimal interrupts and avoidance of race conditions.

Another object of this invention is to provide a communications mechanism for operation between controller and host which permits the host to verify correct operation of the controller at the time of initialization.

Still another object of the invention is to provide a communications mechanism which minimizes the generation of host interrupts by the controller during peak input/output loads.

Still another object of this invention is to provide an interface between host and controller which allows for parallel operation of multiple devices attached to an individual controller, with full duplexing of operation initiation and completion signals.

SUMMARY OF THE INVENTION

In accordance with this invention, the host-controller interconnection is accomplished through an interface which includes a set of data structures employing a dedicated communications region in host memory. This communications region is operated on by both the host and the peripheral controller in accordance with a set of rules discussed below. Basically, this interface has two layers: (1) a transport mechanism, which is the physical machinery for the bi-directional transmission of words and control signals between the host and the controller and (2) a port, which is both hardware for accomplishing exchanges via the transport mechanism and a process implementing a set of rules and procedures governing those exchanges. This port "resides" partly in the host and partly in the controller and has the purposes of facilitating the exchange of control messages (i.e., commands and responses) and verifying the correct operation of the transport mechanism.

Commands and responses are transmitted between the host and a peripheral controller as packets, over an input/output bus of the host, via transfers which do not require processor interruption. These transfers occur to and from the dedicated communication region in the host memory. The port polls this region for commands and the host polls it for responses. A portion of this communication region comprises a command (i.e., transmission) list and another portion comprises a response (i.e., receiving) list. An input/output operation begins when the host deposits a command in the command list. The operation is seen as complete when the corresponding response packet is removed by the host from the response list.

More specifically, the communications region of host memory consists of two sections: (1) a header section and (2) a variable-length section. The header section contains interrupt identification words. The variable-length section contains the response and command lists, organized into "rings". A "ring" is a group of memory locations which is addressable in rotational (i.e., modulo) sequence, such that when an incrementing counter (modulo-buffer-size) is used for addressing the buffer, the address of the last location is the sequence is followed next by the address of the first location. Each buffer entry, termed a descriptor, includes (1) an address where a command may be found for transmission or where a response is written, as appropriate, and (2) a so-called "ownership" byte (which in its most elementary form reduces to a sigle ownership bit) which is used by the processors to control access to the entry.

Because of properties which will be outlined below, the port may be considered to be effectively integral with the controller; all necessary connections between the host and peripheral can be established by the port/controller when it is initialized.

The port can itself generate processor interrupts; this happens at the option of the host only when the command ring makes a transition from a full to a not-full condition or when the response ring makes the converse transition from empty to non-empty. Thus, the rings buffer the asynchronous occurrence of command and response packets, so that under favorable conditions long strings of commands, responses and exchanges can be passed without having to interrupt the host processor.

An input/output operation begins when the host deposits a command into the command list. The operation is seen as complete when the corresponding response is removed by the host from the response list. Only the host writes into the command ring (i.e., list) and only the controller writes into the response ring. The "ownership" bit for each ring entry is set to a first state by the processor which writes the ring entry and is cleared from that state by the other processor only after the command has been sent or the response read. In addition, after writing an entry, the same processor cannot alter it until the other processor has cleared that entry's ownership bit.

By organizing the command and response lists into rings and controlling their operation through a rigid sequential protocol which includes an ownership byte (or bit) for each ring entry and rules for setting and clearing the ownership byte, the host and controller processors are allowed to operate at their own rates and the need for a hardware bus interlock in avoided. This allows the system to utilize, for example, the UNIBUS communication interconnection of Digital Equipment Corp., Maynard, Mass., which is an exemplary bus lacking a hardware interlock feature.

These and other features, advantages and objects of the present invention will become more readily apparent from the following detailed description, which should be read in conjunction with the accompanying drawings.

BRIEF DESCRIPTION OF THE DRAWING

FIG. 1 is a conceptual block diagram of a system employing an architecture in which the present invention sees utility;

FIG. 2 is a basic block diagram of a data processing system in which the present invention may be employed;

DETAILED DESCRIPTION OF AN ILLUSTRATIVE EMBODIMENT

Figure 3A:
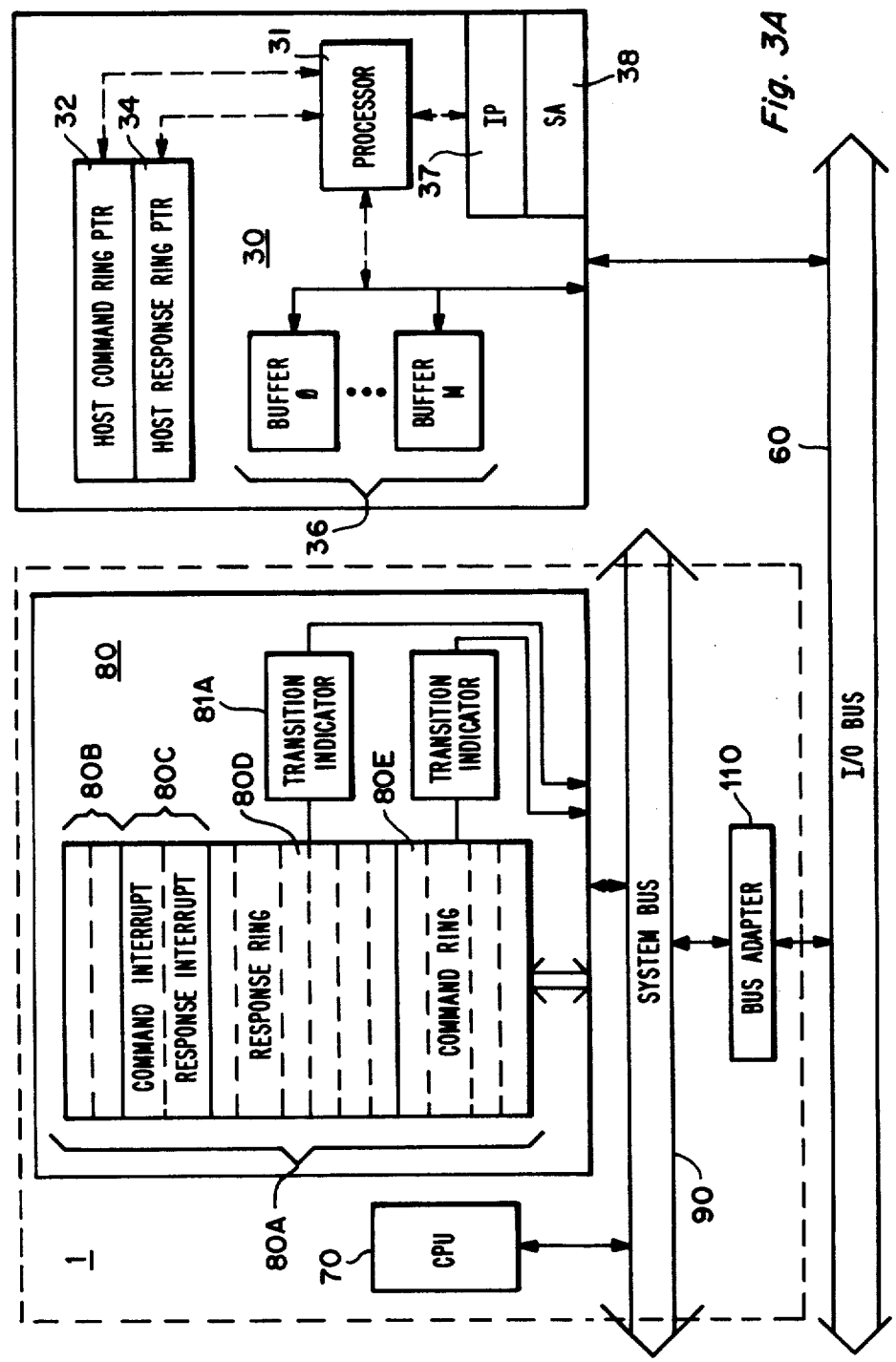
FIG. 3A is a system block diagram of an illustrative embodiment of a data processing system utilizing the interface of the present invention.

The present invention sees particular utility in a data processing system having an architectural configuration designed to enhance development of future mass storage systems, at reduced cost. Such a system is shown in FIG. 1. In this system, a high level protocol (indicated at 1A) is employed for communications between a host computer 1 and intelligent mass storage controller to. Such a high level protocol is intended to free the host from having to deal with peripheral device-dependent requirements (such as disk geometry and error recovery strategies). This is accomplished in part through the use of a communications hierachy in which the host communicates with only one or two peripheral device "class" drivers, such as a driver 4 instead of a different I/O driver for each model of peripheral device. For example, there may be one driver for all disk class devices and another for all tape class devices.

Each class driver, in turn, communicates with a device controller (e.g., 2) through an interface mechanism 10. Much of the interface mechanism 10 is bus-specific. Therfore, when it is desired to connect a new mass storage device to the system, there is no need to change the host's input/output processes or operating system, which are costly (in time, as well as money) to develop. Only the controller need be modified to any substantial degree, which is far less expensive. And much of that cost can be averted if the controller and host are made self-adaptive to certain of the storage device's characteristics, as explained in the above-identified commonly assigned applications.

Device classes are determined by their storage and transfer characteristics. For example a so-called "disk class" is characterized by a fixed block length, individual block update capability, and random access. Similarly a so-called "tape class" is characterized by a variable block length, lack of block update capability, and sequential access. Thus, the terms "disk" and "tape" as used herein refer to devices with such characteristics, rather than to the physical form of the storage medium.

Within the framework of this discussion, a system comprises a plurality of subsystems interconnected by a communications mechanism (i.e. a bus and associated hardware). Each subsystem contains a port driver, (4 or 5) which interfaces the subsystem to the communications mechanism. The communications mechanism contains a port (8 or 9) for each subsystem; the port is simply that portion of the communications mechanism to which a port driver interfaces directly.

FIG. 1 illustrates an exemplary system comprising a host 1 and an intelligent mass storage controller 2. Host 1 includes a peripheral class driver 3 and a port driver 4. Controller 2, in turn, includes a counterpart port driver 5 and an associated high-level protocol server 2. A communications mechanism 7 connects the host to the controller, and vice-versa. The communications mechanism includes a port (i.e., interface mechanism) (8,9) for each port driver.

The port drivers 4 and 5 provide a standard set of communications services to the processes within their subsystems; port drivers cooperate with each other and with the communications mechanism to provide these services. In addition, the port drivers shield the physical characteristics of the communications mechanism from processes that use the communications services.

Class driver 3 is a process which executes within host 1. Typically, a host class I/O driver 3 communicates with a counterpart in the controller 2, called a high-level protocol server, 6.

The high-level protocol server 6 processes host commands, passes commands to device-specific modules within the controller, and sends responses to host commands back to the issuing class driver.

In actual implementation, it is also possible for the functions of the controller-side port driver 5 and port 9 to be performed physically at the host side of the communications mechanism 7. This is shown in the example described below. Nevertheless, the diagram of FIG. 1 still explains the architectural concepts involved.

Note also that for purposes of the further explanation which follows, it is generally unnecessary to distinguish between the port and its port driver. Therefore, unless the context indicates otherwise, when the word "port" is used below, it presumes and refers to the inclusion of a port driver, also.

Referring now to FIG. 2, there is shown a system level block diagram of a data processing system utilizing the present invention. A host computer 1 (including an interface mechanism 10) employs a secondary storage subsystem 20 comprising a controller 30, a disk drive 40 and a controller-drive interconnection cable 50. The host 1 communicates with the secondary storage subsystem 20 over an input/output bus 60.

FIG. 3A expands the system definition to further explain the structure of the host 1, controller 30 and their interface. As illustrated there, the host 1 comprises four primary subunits: a central processor unit (CPU) 70, a main memory 80, a system bus 90 and a bus adapter 110.

A portion 80A of memory 80 is dedicated to service as a communications region for accessing the remainder of memory 80. As shown in FIG. 3A, communications area 80A comprises four sub-regions, or areas. Areas 80B and 80C together form the above-indicated header section of the communications area. Area 80B is used for implementing the bus adapter purge function and area 80C holds the ring transition interrupt indicators used by the port. The variable-length section of the communications region comprises the response list area 80D and the command list area 80E. The lists in areas 80D and 80E are organized into rings. Each entry, in each ring, in turn, contains a descriptor (see FIG. 10) pointing to a memory area of sufficient size to accommodate a command or response message packet of predetermined maximum length, in bytes.

Host 1 may, for example, be a Model VAX-11/780 or PDP 11 computer system, marketed by Digital Equipment Corporation of Maynard, Mass.

System bus 90 is a bi-directional information path and communications protocol for data exchange between the CPU 70, memory 80 and other host elements which are not shown (so as not to detract from the clarity of this explanation). The system bus provides checked parallel information exchanges synchronous with a common system clock. A bus adapter 110 translates and transfers signals between the system bus 90 and the host's input/output (I/O) bus 60. For example, the I/O bus 60 may be the UNIBUS I/O connection, the system bus may be the syncronous backlane interconnection (SBI) of the VAX-11/780 computer, and the bus adapter 110 may be the Model DW780 UNIBUS Adapter, all Digital Equipment Corporation products.

Controller 30 includes several elements which are used specifically for communicating with the host 1. There are pointers 32 and 34, a command buffer 36 and a pair of registers, 37 and 38. Pointers 32 and 34 keep track of the current host command ring entry and the host response ring entry, respectively. Command buffers 36 provide temporary storage for commands awaiting processing by the controller and a pair of registers 37 and 38. Register 37, termed the "IP" register, is used for initialization and polling. Register 38, termed the "SA" register, is used for storing status and address information.

A processor 31 is the "heart" of the controller 30; it executes commands from buffer 36 and does all the housekeeping to keep communications flowing between the host 1 and the drive 40.

The physical realization of the transport mechanism includes the UNIBUS interconnection (or a suitable counterpart) 60, system bus 90 and any association host and/or controller-based logic for adapting to same, including memory-bus interface 82, bus adapter 110, and bus-controller interface 120.

Figure 3C:
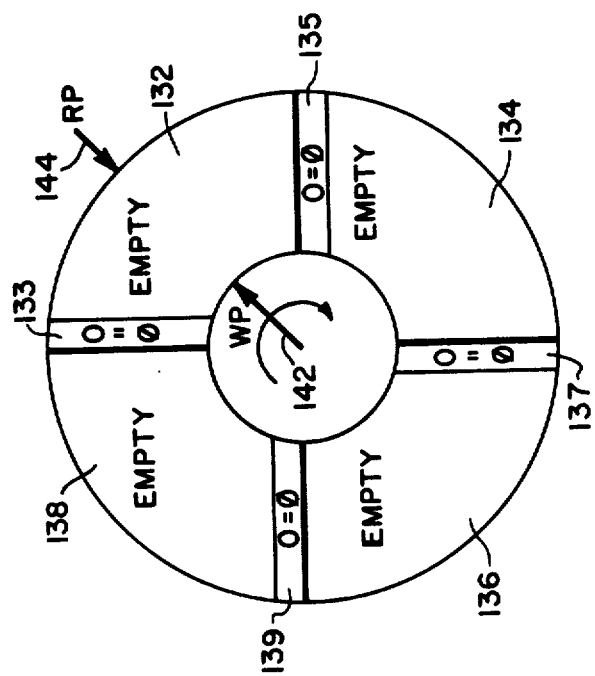
FIGS. 3B and 3C are diagrammatic illustrations of a ring 80D or 80E of FIG. 3A.
Figure 3B:
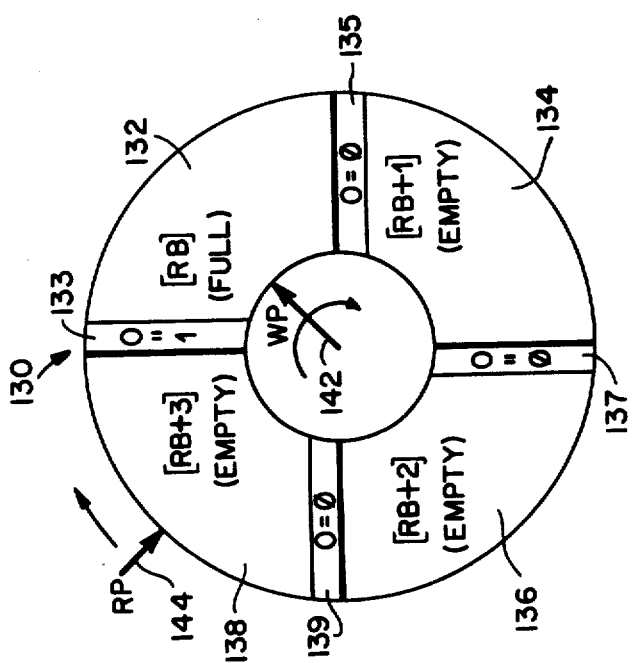

The operation of the rings may be better understood by referring to FIGS. 3B and 3C, where an exemplary four entry ring 130 is depicted. This ring may be either a command ring or a response ring, since only their application differs. Assume the ring 130 has been operating for some time and we have started to observe it at an arbitrarily selected moment, indicated in FIG. 3B. There are four ring entry positions 132-138, with consecutive addresses RB, RB+1, RB+4, respectively. Each ring entry has associated with it an ownership bit (133, 135, 137, 139) which is used to indicate its status. A write pointer (WP), 142, points to the most recent write entry; correspondingly, a read pointer (RP), 144, points to the most recent read entry. In, FIG. 3B, it will be seen that entry 138 has been read, as indicated by the position of RP 144 and the state of ownership bit 139. By convention, the ownership bit is set to 1 when a location has been filled (i.e., written) and to 0 when it has been emptied (i.e., read). The next entry to be read is 132. Its ownership bit 133 is set to 1, indicating that it already has been written. Once entry 132 is read, its ownership bit is cleared, to 0, as indicated in FIG. 3C. This completely empties the ring 130. The next entry 134 cannot be read until it is written and the state of ownership bit 135 is changed. Nor can entry 132 be re-read accidentally, since its ownership bit has been cleared, indicating that it already has been read.

Having thus provided a block diagram explanation of the invention, further understanding of this interface will require a brief digression to explain packet communications over the system.

The port is a communications mechanism in which communications take place between pairs of processes resident in separate subsystems. (As used herein, the term "subsystems" include the host computers and device controllers; the corresponding processes are host-resident class drivers and controller-resident protocol servers.)

Communications between the pair of processes take place over a "connection" which is a soft communications path through the port; a single port typically will implement several connections concurrently. Once a connection has been established, the following three services are available across that connection: (1) sequential message; (2) datagram; and (3) block data transfer.

When a connection is terminated, all outstanding communications on that connection are discarded; that is, the receiver "throws away" all unacknowledge messages and the sender "forgets" that such messages have been sent.

The implementation of this communications scheme on the UNIBUS interconnection 60 has the following characteristics: (1) communications are always point-to-point between exactly two subsystems, one of which is always the host; (2) the port need not be aware of mapping or memory management, since buffers are identified with a UNIBUS address and are contiguous within the virtual buss address space; and (3) the host need never directly initiate a block data transfer.

The port effectively is integral with the controller, even though not full localized there. This result happens by virtue of the point-to-point property and the fact that the device controller knows the class of device (e.g., disk drive) which it controls; all necessary connections, therefore, can be established by the port/controller when it is initialized.

The Sequential Message service guarantees that all messages sent over a given connection are transmitted sequentially in the order originated, duplicate-free, and that they are delivered. That is, messages are received by the receiving process in the exact order in which the sending process queued them for transmission. If these guarantees cease to be met, or if a message cannot be delivered for any reason, the port enters the so-called "fatal error" state (described below) and all port connections are terminated.

The Datagram service does not quarantee reception, sequential reception of duplicate-free reception of datagrams, though the probability of failure may be required to be very low. The port itself can never be the cause of such failures; thus, if the using processes do make such guarantees for datagrams, then the datagram service over the port becomes equivalent to the Sequential Message service.

The Block Data Transfer service is used to move data between named buffers in host memory and a peripheral device controller. In order to allow the port to be unaware of mapping or memory management, the "Name" of a buffer is merely the bus address of the first byte of the buffer. Since the host never directly initiates a block data transfer, there is no need for the host to be aware of controller buffering.

Since the communicating processes are asynchronous, flow control is needed if a sending process is to be prevented from producing congestion or deadlock in a receiving process (i.e., by sending messages more quickly than the receiver can capture them). Flow control simply guarantees that the receiving process has buffers in which to place incoming messages; if all such buffers are full, the sending process is forced to defer transmission until the condition changes. Datagram service does not use flow control. Consequently, if the receiving process does not have an available buffer, the datagram is either processed immediately or discarded, which possibility explicitly is permitted by the rules of that service. By contrast, the Sequential Message service does use flow control. Each potential receiving process reserves, or pre-allocates, some number of buffers into which messages may be received over its connection. This number is therefore the maximum number of messages which the sender may have outstanding and unprocessed at the receiver, and it is communicated to the sender by the receiver in the form of a "credit" for the connection. When a sender has used up its available credit, it must wait for the receiver to empty and make available one of its buffers. The message credits machinery for the port of the present invention is described in detail below.

The host-resident driver and the controller provides transport mechanism control facilities for dealing with: (1) transmission of commands and responses; (2) sequential delivery of commands; (3) asynchronous commication; (4) unsolicited responses; (5) full duplex communication; and (6) port failure recovery. That is, commands, their responses and unsolicited "responses" (i.e., controller-to-host messages) which are not responsive to a command may occur at any time; full duplex communication is necessary to handle the bi-directional flow without introducing the delays and further buffering needs which would be associated with simplex communications. It is axiomatic that the host issues commands in some sequence. They must be fetched by the controller in the order in which they were queued to the transport mechanism, even if not executed in that sequence. Responses, however, do not necessarily occur in the same order as the initiating commands; and unsolicited messages can occur at any time. Therefore, asynchronous communications are used in order to allow a response or controller-to-host message to be sent whenever it is ready. Finally, as to port failure recovery, the host's port driver places a timer on the port, and reinitializes the port in the event the port times out.

This machinery must allow repeated access to the same host memory location, whether for reads, writes, or any mixture of the two.

The SA and IP registers (37 and 38) are in the I/O page of the host address space, but in controller hardware. They are used for controlling a number of facets of port operation. These registers are always read as words. The register pair begins on a longword boundary. Both have predefined addresses. The IP register has two functions: first, when written with any value, it causes a "hard" initialization of the port and the device controller; second, when read while the port is operating, it causes the controller to initiate polling of the command ring, as discussed below. The SA register 38 has four functions: first, when read by the host during initialization, it communicates data and error information relating to the initialization process; second, when written by the host during initialization, it communicates certain host-specific parameters to the port; third, when read by the host during normal operation, it communicates status information including port- and controller-detected fatal errors; and fourth, when zeroed by the host during initialization and normal operation, it signals the port that the host has successfully completed a bus adapter purge in response to a port-initiated purge request.

The port driver in the host's operating system examines the SA register regularly to verify normal port- /controller operation. A self-detected port/controller fatal error is reported in the SA register as discussed below.

Transmission of Commands and Responses-Overview

Figure 4A:
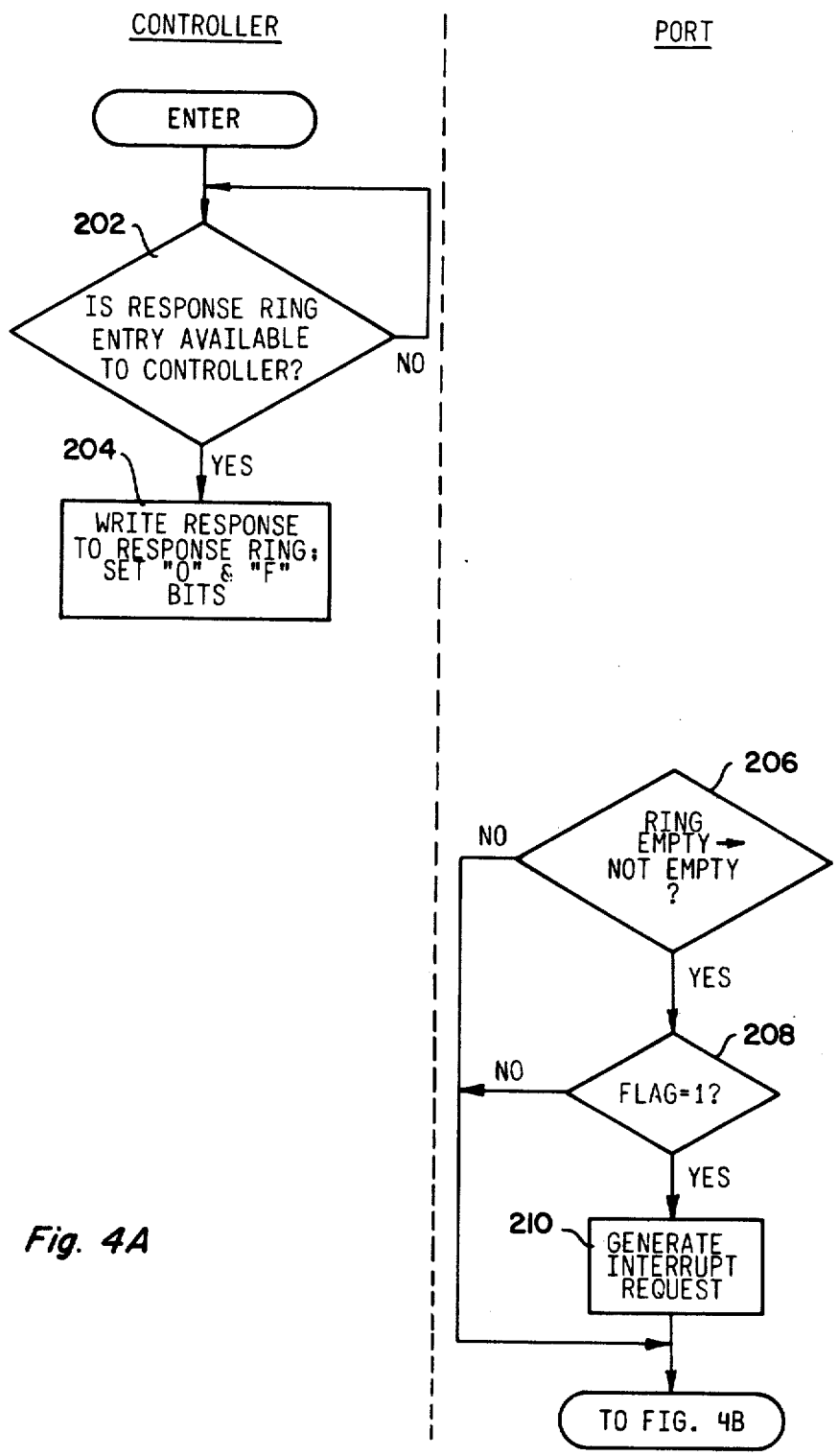
FIGS. 4A and 4B are elementary flow diagrams illustrating the sequence of events when the controller wishes to send a response to the host.
Figure 4B:
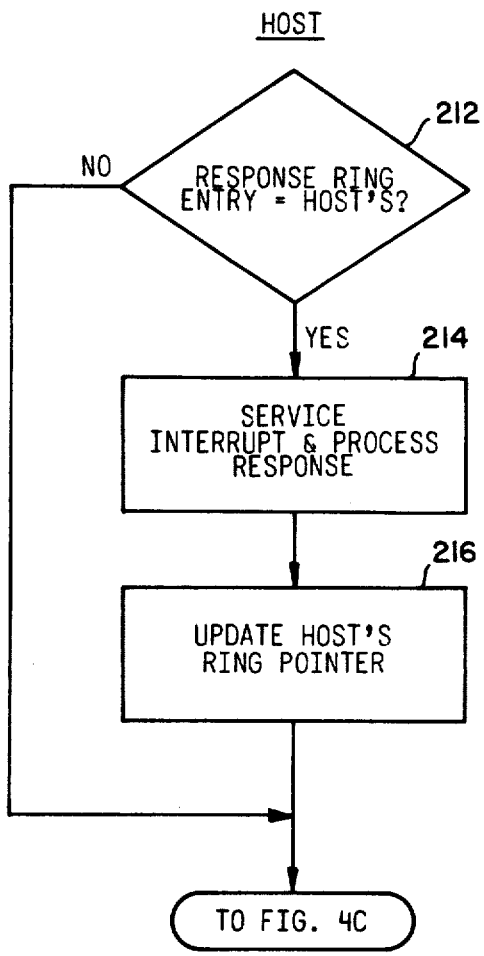

When the controller desires to send a response to the host, a several step operational sequence takes place. This sequence is illustrated in FIGS. 4A and 4B. Initially, the controller looks at the current entry in the response ring indicated by the response ring pointer 34 and determines whether that entry is available to it (by using the "ownership" bit). (Step 202.) If not, the controller continues to monitor the status of the current entry until it becomes available. Once the controller has access to the current ring entry, it writes the response into a response buffer in host memory, pointed to by that ring entry, and indicates that the host now "owns" that ring entry by clearing and "Ownership" bit; it also sets a "FLAG" bit, the function of which is discussed below. (Step 204.)

Next, the port determines whether the ring has gone from an empty to a non-empty transition (step 206); if so, a potentially interruptable condition has occurred. Before an interrupt request is generated, however, the port checks to ensure that the "FLAG" bit is a 1 (step 208); an interrupt request is signalled only on an affirmative indication (Step 210).

Upon receipt of the interrupt request, the host, when it is able to service the interrupt, looks at the current entry in the response ring and determines whether it is "owned" by the host or controller (i.e., whether it has yet been read by that host). (Step 212.) If it is owned by the controller, the interrupt request is dismissed as spurious. Otherwise, the interrupt request is treated as valid, so the host processes the response (Step 214) and then updates its ring pointer (Step 216).

Figure 5:
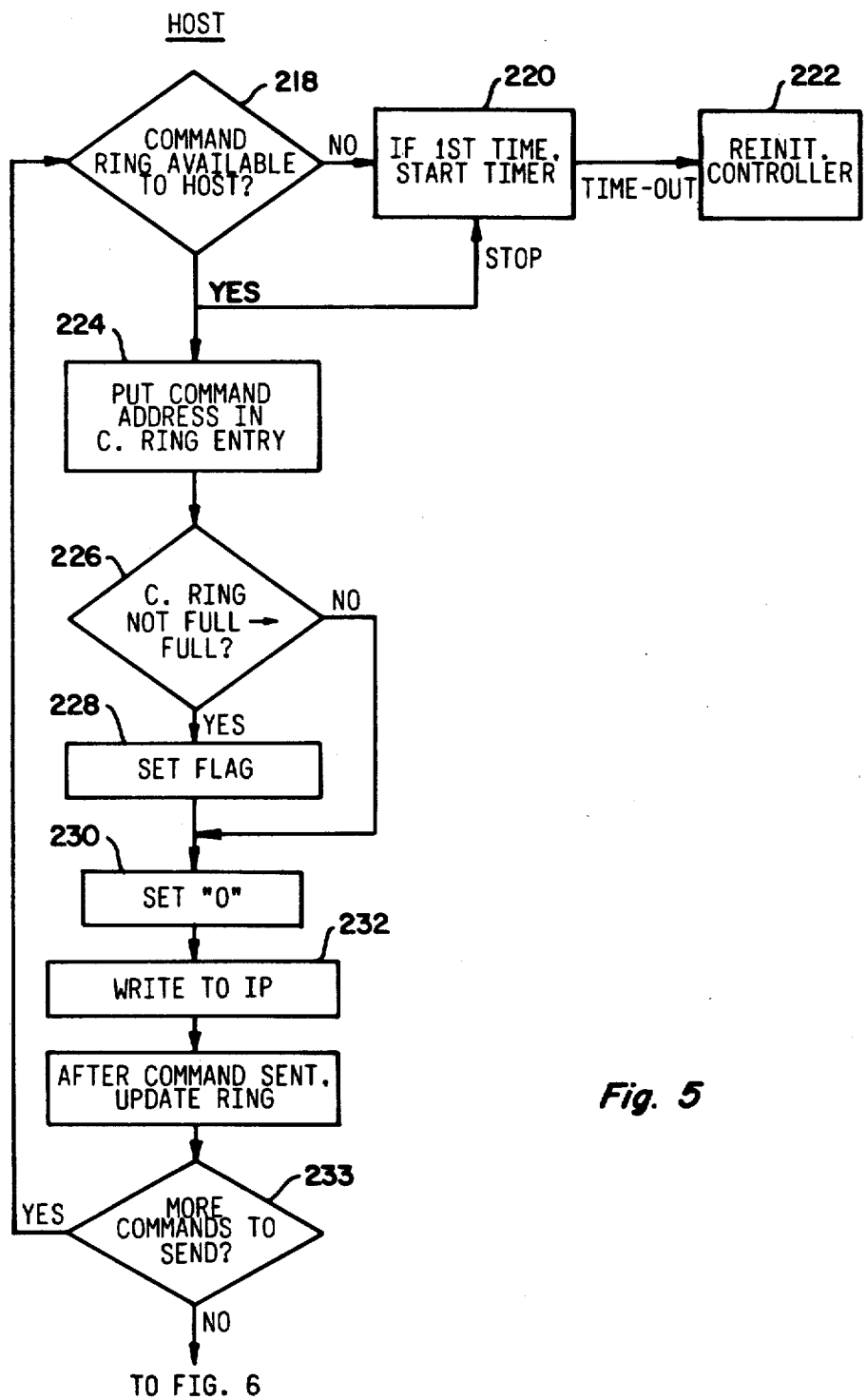
FIG. 5 is an elementary flow diagram showing the sequence of events when the host issues a command to the controller.

Similar actions take place when the host wants to send a command, as indicated in FIG. 5. To start the sequence, the host looks at the current command ring entry and determines whether that ring entry is owned by the host or controller. (Step 218.) If it is owned by the controller, the host starts a timer (Step 220.) (provided that is the first time it is looking at that ring entry), if the timer is not stopped (by the command ring entry becoming available to the host) and is allowed to time out, a failure is indicated; the port is the reinitialized. (Step 222.) If the host owns the ring entry, however, it puts the packet address of the command in the current ring entry. (Step 224.) If a command ring transfer interrupt is desired (step 226), the FLAG bit is set=1 to so indicate (step 228). The host then sets the "ownership" bit=1 the ring entry to indicate that there is a command in that ring entry to be acted upon. (Step 230.) The port is then told to "poll" the ring (i.e., the host reads the IP register, which action is interpreted by the port as a notification that the ring contains one or more commands awaiting transmission; in response, the port steps through the ring entries one by one until all entries awaiting transmission have been sent. (Step 232.)

The host next determines whether it has additional commands to send. (Step 233.) If so, the process is repeated; otherwise, it is terminated.

Figure 6:
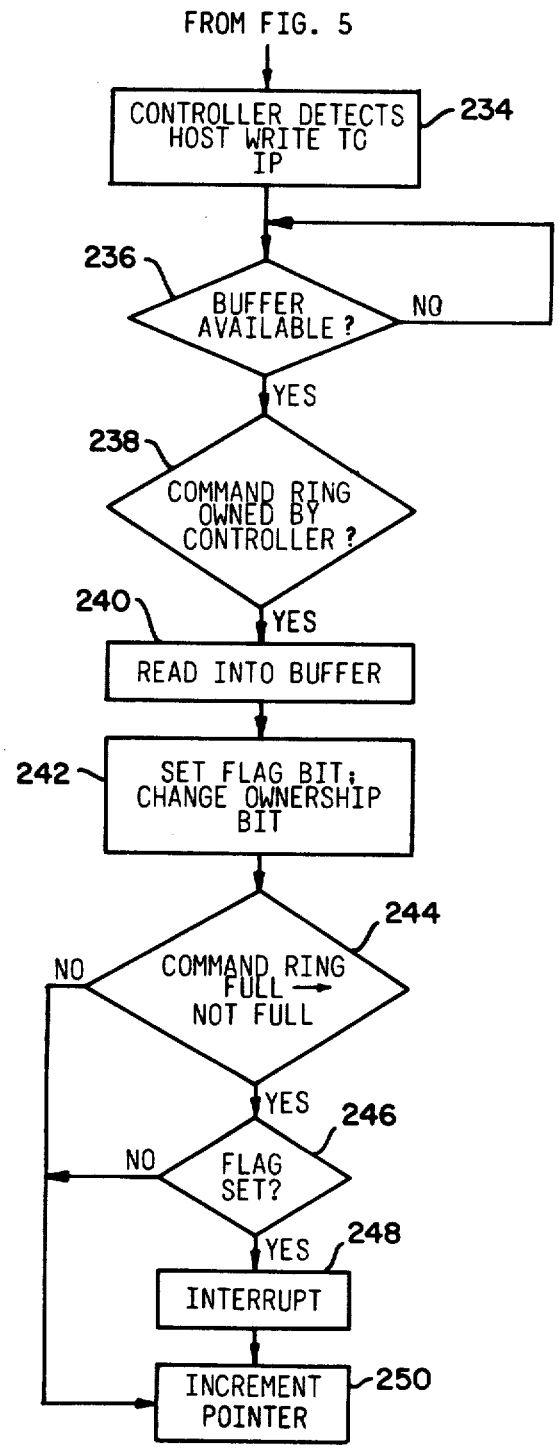
FIG. 6 is a similar flow diagram showing the controller's action in response to the host's issuance of a command.

In responding to the issuance of a command (see FIG. 6), the port first detects the instruction to poll (i.e., the read operation to the IP register). (Step 234.) Upon detecting that signal, the port must determine whether there is a buffer available to receive a command. (Step 236.) It waits until the buffer is available and then reads the current ring entry to determine whether that ring entry is owned by the port or host. (Step 238.) If owned by the port, the command packet is read into a buffer. (Step 240.) The FLAG bit is then set and the "ownership" bit in the ring entry is changed to indicate host ownership. (Step 242.) If not owned by the port, polling terminates.

A test is then performed for interrupt generation. First the port determines whether the command ring has undergone a full to not-full transition. (Step 244.) If so, the port next determines whether the host had the FLAG bit set. (Step 246.) If the FLAG bit was set, an interrupt request is generated. (Step 248.) The ring pointer is then incremented. (Step 250.)

Response packets continue to be removed after the one causing an interrupt and, likewise, command packets continue to be removed by the port after a poll.

The Communications Area

Figure 7:
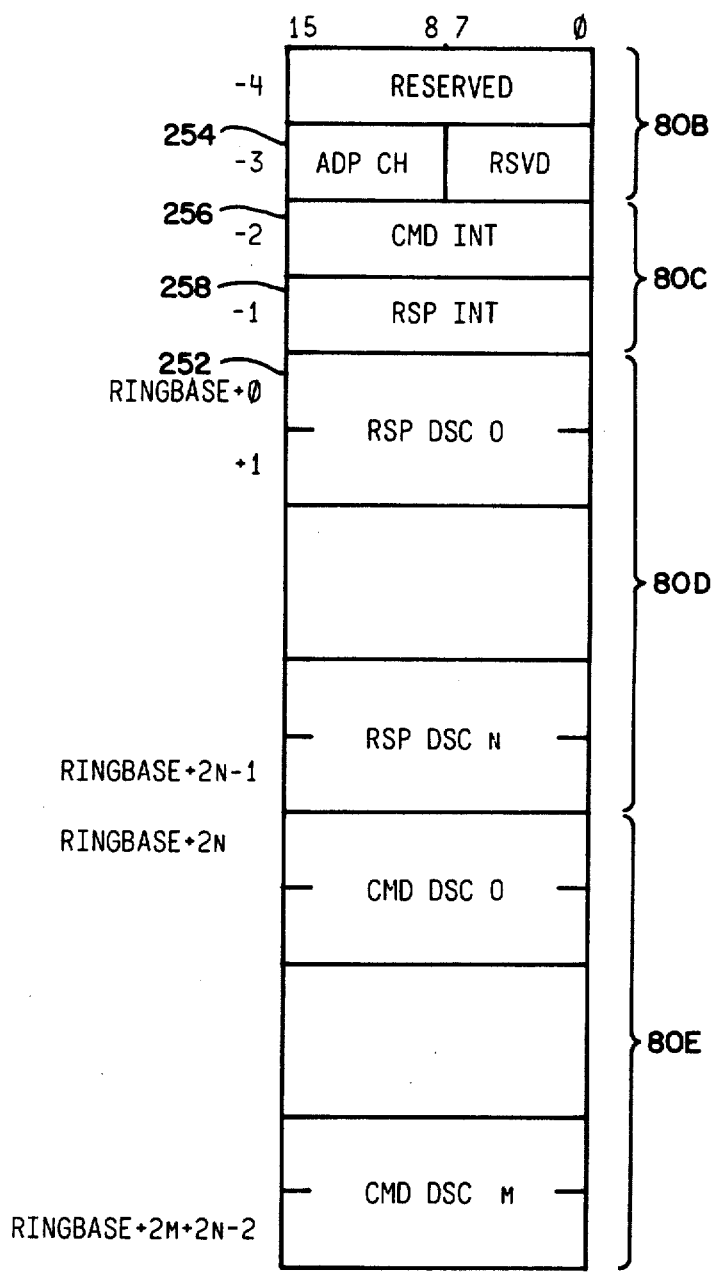
FIG. 7 is a diagrammatic illustration of the communications area of host memory, including the command and response rings.

The communications area is aligned on a 16-bit word boundary whose layout is shown in FIG. 7. Addresses for the words of the rings are identified relative to a "ringbase" address 252. The words in regions 80B, 80C whose addresses are ringbase-3, ringbase-2 and ringbase-1 (hereinafter designated by the shorthand [ringbase-3], etc., where the brackets should be read as the location "whose address is") are used as indicators which are set to zero by the host and which are set non-zero by the port when the port interrupts the host, to indicate the reason for the interrupt. Word [ringbase-3] indicates whether the port is requesting a bus adapter purge; the non-zero value is the adapter channel number contained in the high-order byte 254 and derived from the triggering command. (The host responds by performing the purge. Purge completion is signalled by writing zeros to the SA register).

Word 256 [ringbase-2] signals that the command queue has transitioned from full to not-full. Its non-zero value is predetermined, such as one. Similarly, word 258 [ringbase-19 indicates that the response queue has transitioned from empty to not-empty. Its non-zero value also is predetermined (e.g., one).

Each of the command and response lists is organized into a ring whose entries are 32-bit descriptors. Therefore, for each list, after the last location in the list has been addressed, the next location in sequence to be addressed is the first location in the list. That is, each list may be addressed by a modulo-N counter, where N is the number of entries in the ring. The length of each ring is determined by the relative speeds with which the host and the port/controller generate and process messages; it is unrelated to the controller command limit. At initialization time, the host sets the ring lenghts.

Figure 8:
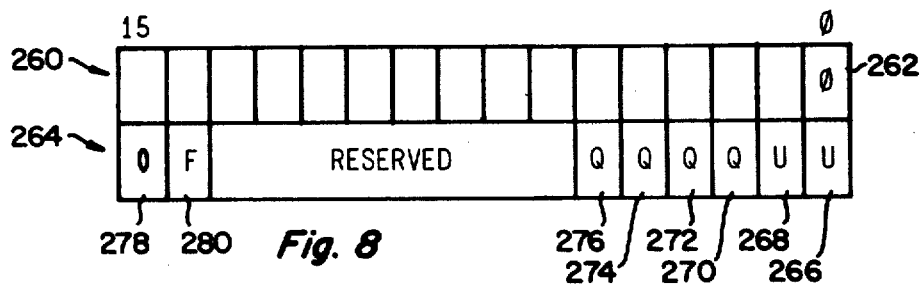
FIG. 8 is a diagrammatic illustration of the formatted command and response descriptors which comprise the ring entries.

Each ring entry, or formatted descriptor, has the layout indicated in FIG. 8. In the low-order 16-bit (260), the least significant bit, 262, is zero; that is, the envelope address [text+0] is word-aligned. The remaining low-order bits are unspecified and vary with the data. In the high-order portion 264 of the descriptor, the letter "U" in bits 266 and 268 represent a bit in the high-order portion of an 18-bit UNIBUS (or other bus) address. Bits 270-276, labelled "Q", are available for extending the high-order bus address; they are zero for UNIBUS systems. The most significant bit, 278, contains the "ownership" bit ("O") referred to above; it indicates whether the descriptor is owned by the host (0=1), and acts as an interlock protecting the descriptor against premature access by either the host or the port. The next lower bit, 280, is a "FLAG" bit (labelled "F") whose meaning varies depending on the state of the descriptor. When the port returns a descriptor to the host, it sets F=1, indicating that the descriptor is full and points to response. On the other hand, when the controller acquires a descriptor from the host, F=1 indicates that the host wants a ring transition interrupt due to this slot. It assumes that transition interrupts were enabled during initialization and that this particular slot triggers the ring transition. F=0 means that the host does not want a transition host interrupt, even if interrupts were enabled during initialization. The port always sets F=1 when returning a descriptor to the host; therefore, a host desiring to override ring transition interrupts must always clear the FLAG bit when passing ownership of a descriptor to the port.

Message Envelopes

Figure 9:
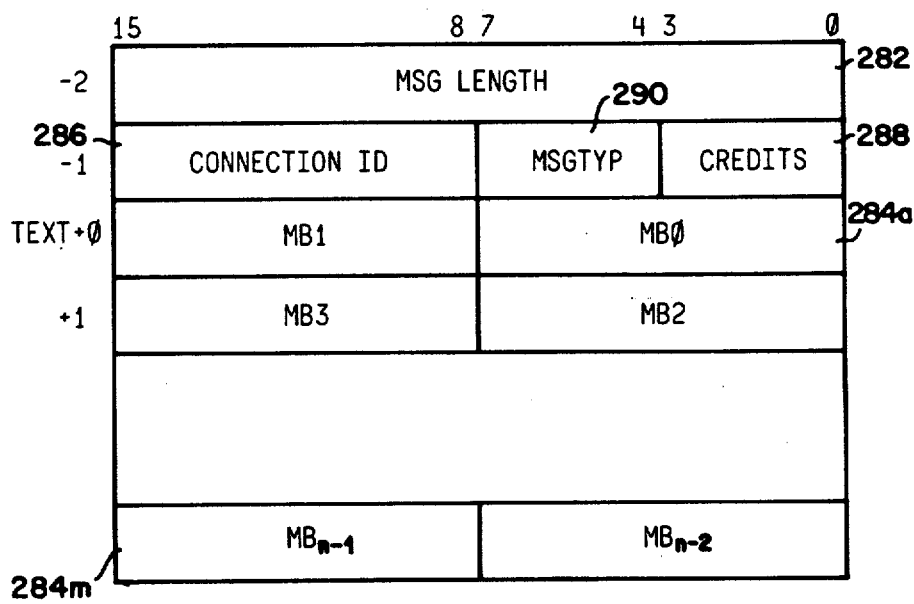
FIG. 9 is a diagrammatic illustration of the command and response message envelopes.

As stated above, messages are sent as packets, with an envelope address pointing to word [text+0] of a 16-bit, word-aligned message envelope formatted as shown in FIG. 9.

The MSG LENGTH field 282 indicates the length of the message text, in bytes. For commands, the length equals the size of the command, starting with [text+0]. For responses, the host sets the length equal to the size of the response buffer, in bytes, starting with [text+0]. By design, the minimum acceptable size is 60 bytes of message text (i.e., 64 bytes overall).

The message length field 282 is read by the port before the actual transmission of a response. The port may wish to send a response longer than the host can accept, as indicated by the message length field. In that event, it will have to break up the message into a plurality of packets of acceptable size. Therefore, having read the message length field, the controller then sends a response whose length is either the host-specified message length or the length of the controller's response, if smaller. The resulting value is set into the message length field and sent to the host with the message packet. Therefore, the host must re-initialize the value of that field for each proposed response.

The message text is contained in bytes 284a-284m, labelled MBj. The "connection id" field 286 identifies the connection serving as source of, or destination for, the message in question. The "credits" field 288 gives the credit value associated with the message, which is discussed more fully below. The "msgtyp" field 290 indicates the message type. For example, a zero may be used to indicate a sequential message, wherein the credits and message length fields are valid. A one may indicate a datagram, wherein the credits field must be zero, but message length is valid. Similarly, a two may indicate a credit notification, with the credits field valid and the message length field zero.

Message Credits

A credit-based message limit mechanism is employed for command and response flow control. The credits field 288 of the message envelope supports credit-accounting algorithm. The controller 30 has a buffer 36 for holding up to M commands awaiting execution. In its first response, the controller will return in the credits field the number, M, of commands its buffer can hold. This number is one more than the controller's acceptance limit for non-immediate commands; the "extra" slot is provided to allow the host always to be able to issue an immediate-class command. If the credit account has a value of one, then the class driver may issue only an immediate-type command. If the account balance is zero, the class driver may not issue any commands at all.

The class driver remembers the number M in its "credit account". Each time the class driver queues a command, it decrements the credit account balance by one. Conversely, each time the class driver receives a response, it increments the credit account balance by the value contained in the credits field of that response. For unsolicited responses, this value will be zero, since no command was executed to evoke the response; for solicited responses, it normally will be one, since one command generally gives one to one response.

For a controller having M greater than 15, responses beyond the first will have credits greater than one, allowing the controller to "walk" the class driver's credit balance up to the correct value. For a well-behaved class driver, enlarging the command ring beyond the value M+1 provides no performance benefits; in this situation command ring transition interrupts will not occur since the class driver will never fill the command ring.

The Ownership Bit

The ownership bit 278 in each ring entry is like the flag on an old-fashioned mailbox. The postman raised the flag to indicate that a letter had been put in the box. When the box was emptied, the owner would lower the flag. Similarly, the ownership bit indicates that a message has been deposited in a ring entry, and whether or not the ring entry (i.e., mailbox) has been emptied. Once a message is written to a ring entry, that message must be emptied before a second message can be written over the first.

For a command descriptor, the ownership bit "O" is changed from zero to one when the host has filled the descriptor and is releasing it to the port. Conversely, once the port has emptied the command descriptor and is returning the empty slot to the host, the ownership bit is changed from one to zero. That is, to send a command the host sets the ownership bit to one; the port clears it when the command has been received, and returns the empty slot to the host.

To guarantee that the port/controller sees each command in a timely fashion, whenever the host inserts a command in the command ring, it must read the IP register. This forces the port to poll if it was not already polling.

For a response descriptor, when the ownership bit 0 undergoes a transition from one to zero, that means that the port has filled the descriptor and is releasing it to the host. The reverse transition means that the host has emptied the response descriptor and is returning the empty slot to the port. Thus, to send a response the port clears the ownership bit, while and the host sets it when the response has been received, and returns the empty slot to the port.

Just as the port must poll for commands, the host must poll for responses, particularly because of the possibility of unsolicited responses.

Interrupts

The transmission of a message will result in a host interrupt if and only if interrupts were armed (i.e., enabled) suitably during initialization and one of the following three conditions has been met: (1) the message was a command with flag 280 equal to one (i.e., F=1), and the fetching of the command by the port caused the command ring to undergo a transition from full to not-full; (2) if the message was a response with F=1 and the depositing of the message by the port caused the response ring to make a transition from empty to not-empty; or (3) the port is interfaced to the host via a bus adapter and a command required the port/controller to re-access a given location during data transfer. (The latter interrupt means that the port/controller is requesting the host to purge the indicated channel of the bus adapter.)

Port Polling

The reading of the IP register by the host causes the port/controller to poll for commands. The port/controller begins reading commands out of host memory; if the controller has an internal command buffering capability, it will write commands into the buffer if they can't be executed immediately. The port continues to poll for full command slots until the command ring is found to be empty, at which time it will cease polling. The port will resume polling either when the controller delivers a response to the host, or when the host reads the IP register.

Correspondingly, response polling for empty slots continues until all commands buffered within the controller have been completed and the associated responses have been sent to the host.

Host Polling

Since unsolicited responses are possible, the host cannot cease polling for responses when all outstanding commands have been acknowledged, though. If it did, an accumulation of unsolicited messages would first saturate the response ring and then any controller internal message buffers, blocking the controller and preventing it from processing additional commands. Thus, the host must at least occassionally scan the response ring, even when not expecting a response. One way to accomplish this is by using the ring transition interrupt facility described above; the host also should remove in sequence from the response ring as many responses as it finds there.

Data Transmission

Data transmission details are controller-dependent. There are certain generic characteristics, however.

Figure 10:
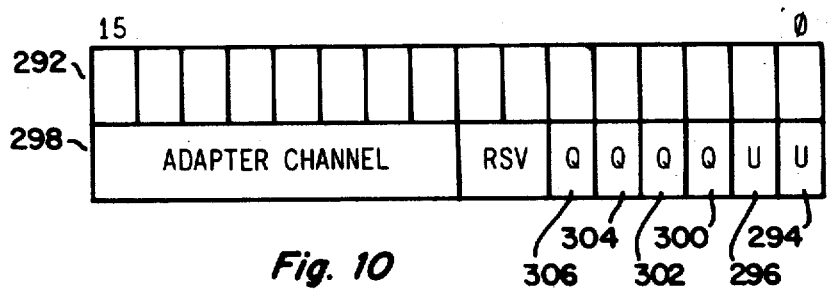
FIG. 10 is a diagrammatic illustration of a buffer description according to the present invention.

Data transfer commands are assumed to contain buffer descriptors and byte or word counts. The buffers serve as sources or sinks for the actual data transfers, which are effected by the port as non-processor (NPR or DMA) transfers under command-derived count control to or from the specified buffers. A buffer descriptor begins at the first word allocated for this purpose in the formats of higher-level commands. When used with the UNIBUS interconnection, the port employs a two-word buffer descriptor format as illustrated in FIG. 10. As shown wherein, the bits in the low-order buffer address 292 are message-dependent. The bits labelled "U" (294, 296) in the high-order portion 298 of the buffer descriptor are the high-order bits of an 18-bit UNIBUS address. The bits 300-306, labelled "Q", are usable as an extension to the high-order UNIBUS address, and are zero for UNIBUS systems.

Repeated access to host memory locations must be allowed for both read and write operations, in random sequence, if the interfaces are to support higher-level protocol functions such as transfer restarts, compares, and so forth. In systems with buffered bus adapters, which require a rigid sequencing this necessitates purging of the relevant adapter channel prior to changing from read to write, or vice versa, and prior to breaking an addressing sequence. Active cooperation of the host CPU is required for this action. The port signals its desire for an adapter channel purge, as indicated above under the heading "The Communications Area". The host performs the purge and writes zeroes to the SA register 38 to signal completion.

Transmission Errors

Four classes of transmission errors have been considered in the design of this interface: (1) failure to become bus master; (2) failure to become interrupt master; (3) bus data timeout error; and (4) bus parity error.

When the port (controller) attempts to access host memory, it must first become the "master" of bus 60. To deal cleanly with the possibility of this exercise failing, the port sets up a corresponding "last fail" response packet (see below) before actually requesting bus access. Bus access is then requested and if the port timer expires, the host will reinitialize the port/controller. The port will then report the error via the "last fail" response packet (assuming such packets were eneable during the reinitialization).

A failure to become interrupt master occurs whenever the port attempts to interrupt the host and an acknowledgement is not forthcoming. It is treated and reported the same as a failure to become bus master, although the contents of its last fail response will, of course, be different.

Bus data timeout errors involve failure to complete the transfer of control or data messages. If the controller retires a transfer after it has failed once, and a second try also fails, then action is taken responsive to the detection of a persistent error. If the unsuccessful operation was a control transfer, the port writes a failure code into the SA register and then terminates the connection with the host. Naturally, the controller will have to be reinitialized. On the other hand, if the unsuccessful operation was a data transfer, the port/controller stays online to the host and the failure is reported to the host in the response packet for the involved operation. Bus parity errors are handled the same as bus data timeout errors.

Fatal Errors

Various fatal errors may be self-detected by the port or controller. Some of these may also arise while the controller is operating its attached peripheral device(s). In the event of a fatal error, the port sets in the SA register a one in its most significant bit, to indicate the existence of a fatal error, and a fatal error code in bits 10-0.

Interrupt Generation Rate

Under steady state conditions, at most one ring interrupt will be generated for each operation (i.e., command or response transmission). Under conditions of low I/O rate, this will be due to response ring transitions from empty to not-empty; with high I/O rate, it will be due to command ring transitions from full to not-full. If the operation rate fluctuates considerably, the ratio of interrupts to operations can be caused to decline from one-to-one. For example, an initially low but rising operation rate will eventually cause both the command and response rings to be partially occupied, at which point interrupts will cease and will not resume until the command ring fills and begins to make full to not-full transitions. This point can be staved off by increasing the permissible depth of the command ring. Generally, the permissible depth of the response ring will have to be increased also, since saturation of the response ring will eventually cause the controller to be unwilling to fetch additional commands. At that point, the command queue will saturate and each fetch will generate an interrupt.

Moreover, a full condition in either ring implies that the source of that ring's entries is temporarily choked off. Consequently, ring sizes should be large enough to keep the incidence of full rings small. For the command ring, the optimal size depends on the latency in the polling of the ring by the controller. For the response ring, the optimal size is a function of the latency in the ring-emptying software.

Initialization

A special initialization procedure serves to (1) identify the parameters of the host-resident communications region to the port; (2) provide a confidence check on port/controller integrity; and (3) bring the port/controller online to the host.

The initialization process starts with a "hard" initialization during which the port/controller runs some preliminary diagnostics. Upon successful completion of those diagnostics, there is a four step procedure which takes place. First, the host tells the controller the lengths of the rings, whether initialization interrupts are to be armed (i.e., enabled) and the address(es) of the interrupt vector(s). The port/controller then runs a complete internal integrity check and signals either success or failure. Second, the controller echos the ring lengths, and the host sends the low-order portion of the ringbase address and indicates whether the host is one which requires purge interrupts. Third, the controller sends an echo of the interrupt vector address(es) and the initialization interrupt arming signal. The host then replies with the high-order portion of the ringbase address, along with a signal which conditionally triggers an immediate test of the polling and adapter purge functions of the port. Fourth, the port tests the ability of the input/output bus to perform nonprocessor (NPR) transfers. If successful, the port zeroes the entire communications area and signals the host that initialization is complete. The port then awaits a signal from the host that the controller should begin normal operation.

At each step, the port informs the host of either success or failure. Success leads to the next initialization step and failure causes a restart of the initialization sequence. The echoing of information to the host is used to check all bit positions in the transport mechanism and the IP and SA registers.

Figure 11:
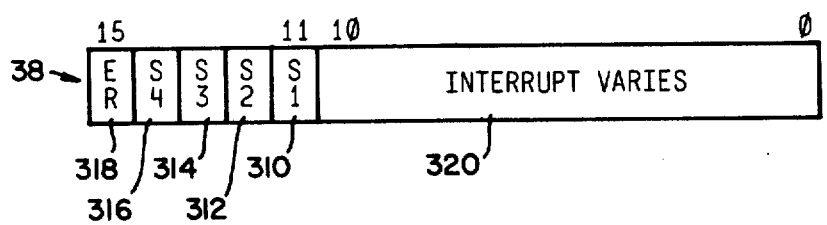
FIG. 11 is a diagrammatic illustration of the status and address (SA) register 38 of FIG. 3A.
Figure 13:
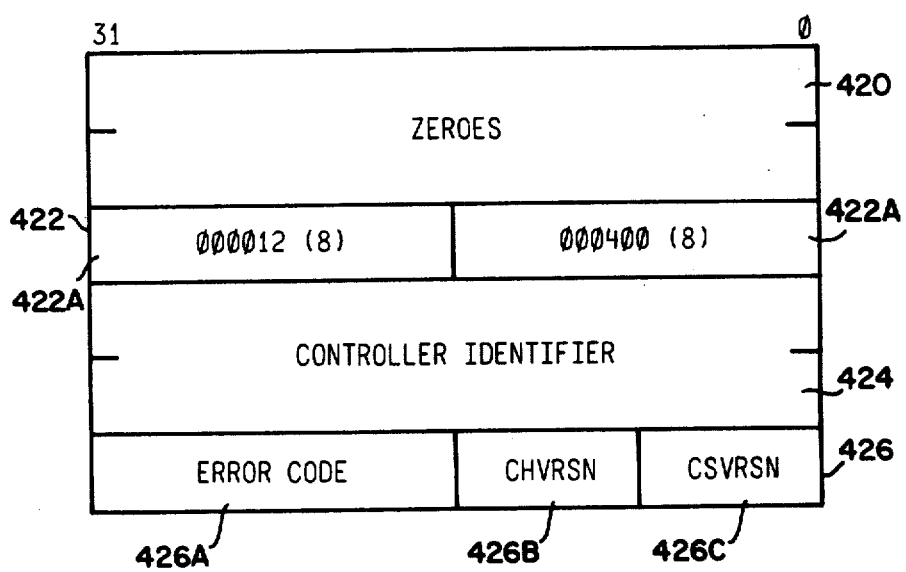
FIG. 13 is a diagrammatic illustration of the "last fail" response packet of this invention.

The SA register is heavily used during initialization. The detailed format and meaning of its contents depend on the initialization step involved and whether information is being read from or written into the register. When being read, certain aspects of the SA format are constant and apply to all steps. This constant SA read format is indicated in FIG. 11. As seen there, the meaning of bits 15-11 of SA register 38 is constant but the interpretation of bits 10-0 varies. The S4-S1 bits, 316-310, are set separately by the port to indicate the initialization step number which the port is ready to perform or is performing. The S1 bit 310 is set for initialization step 1; the S2 bit 312, for initialization step 2, etc. If the host detects more than one of the S1-S4 bits 316-310 set at any time, it restarts the initialization of the port/controller; the second time this happens, the port/controller is presumed to be malfunctioning. The SA register's most significant bit 318, labelled ER, normally is zero; if it takes on the value of 1, then either a port/controllerbased diagnostic test has failed, or there has been a fatal error. In the event of such a failure or error, bits 10-0 comprise a field 320 into which an error code is written; the error code may be either port-generic or controller-dependent. Consequently, the host can determine not only the nature of an error but also the step of the initialization during which it occurred. If no step bit is set but $ER=1$, a fatal error was detected during hard initialization, prior to the start of initialization step 1.

The occurrence of an initialization error causes the port driver to retry the initialization sequence at least once.

Reference will now be made to FIGS. 12A-12D, wherein the details of the initialization process are illustrated.

The host begins the initialization sequence either by performing a hard initialization of the controller (this is done either by issuing a bus initialization (INIT) command (Step 322) or by writing zeroes to the IP register. The port guarantees that the host reads zeroes in the SA register on the next bus cycle. The controller, upon sensing the initialization order, runs a predetermined set of diagnostic routines intended to ensure the minimum integrity necessary to rely on the rest of the sequence. (Step 324.) Initialization then sequences through the four above-listed steps.

At the beginning of each initialization step n, the port clears bit $S_{n-1}$ before setting bit $S_n$; thus, the host will never see bits $S_{n-1}$ and $S_n$ set simultaneously. From the viewpoint of the host, step n begins when reading the SA register results in the transition of bit $S_n$ from 0 to 1. Each step ends when the next step begins, and an interrupt may accompany the step change if interrupts are enabled.

Each of initialization steps 1-3 is timed and if any of those steps fails to complete within the alloted time, that situation is treated as a host-detected fatal error. By contrast, there is no explicit signal for the completion of initialization step 4; rather, the host observes either that controller operation has begun or that a higher-level protocol-dependent timer has expired.

Figure 12A:
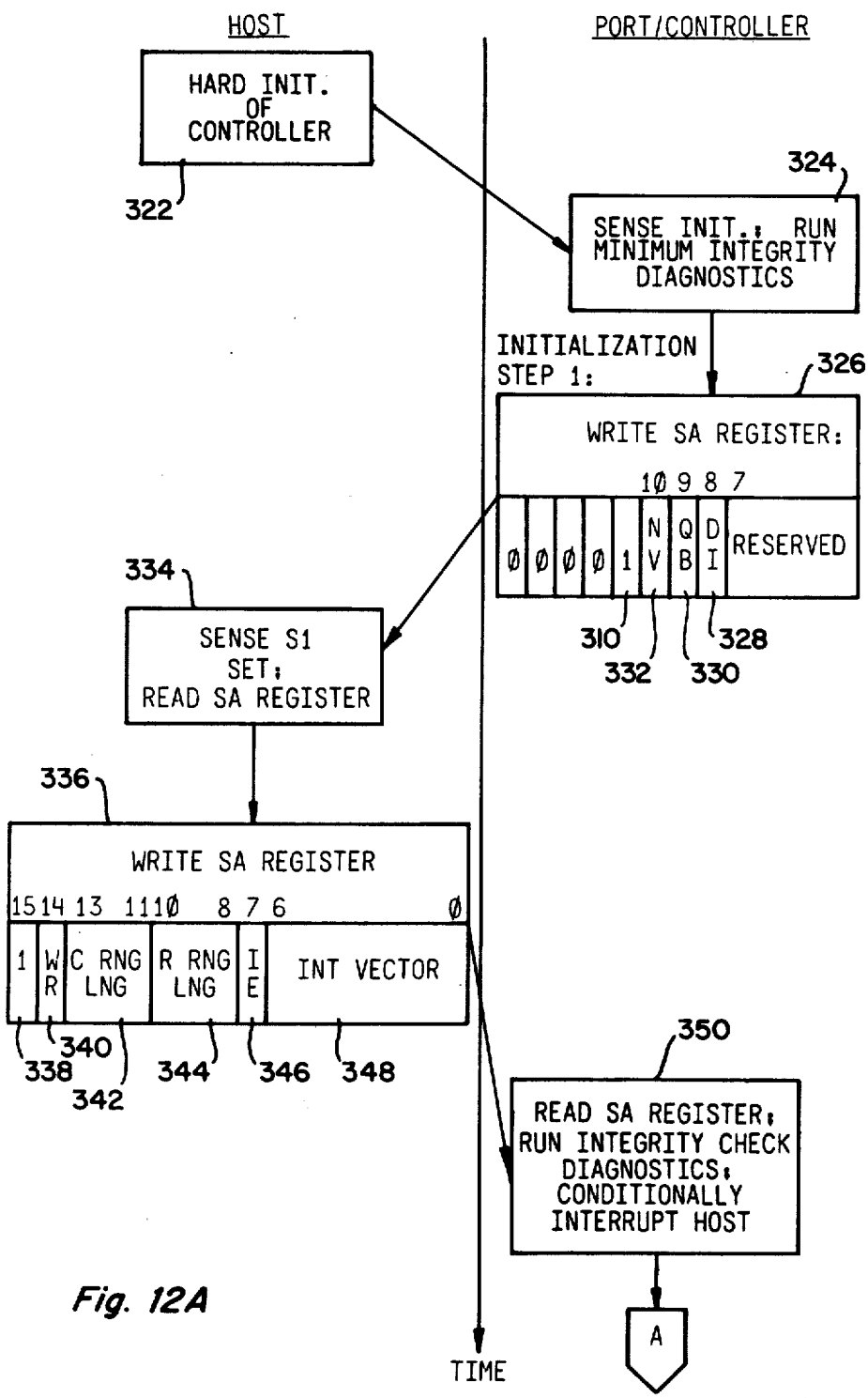
FIGS. 12A-12D are flow charts of the port/controller initialization sequence according to this invention.

The controller starts initialization step 1 by writing to the SA register 38 the pattern indicated in FIG. 12A. (Step 326.) Bits 338-332 are controller-dependent. The "NV" bit, 332, indicates whether the port supports a host-settable interrupt vector address; a bit value of 1 provides a negative answer. The "QB" bit, 330, indicates whether the port supports a 22-bit host bus address; a 1 indicates an affirmative answer. The "DI", bit 328, indicates whether the port implements enhanced diagnostics, such as wrap-around, purge and poll test; an affirmative answer is indicated by a bit value of 1.

The host senses the setting of bit 310, the S1 bit, and reads the SA register. (Step 334.) It then responds by writing into the SA register the pattern shown in step 336. The most significant bit 338 in the SA register 38 is set to a 1, to guarantee that the port does not interpret the pattern as a host "adapter purge ccomplete" response (after a spontaneous reinitialization). The WR bit, 340, indicates whether the port should enter a diagnostic wrap mode wherein it will echo messages sent to it; a bit value of 1 will cause the port to enter that mode.

The port will ignore the WR bit if DI=0 at the beginning of initialization step 1. Field 342, commprising bits 13-11 and labelled "C RNG LNG," indicates the number of entries or slots in the command ring, expressed as a power of 2. Similarily, field 344, comprising bits 10-8 and labelled "R RNG LNG", represents the number of response ring slots, also expressed as a power of 2. Bit 346, the number 7 bit in the register, labelled "IE", indicates whether the host is arming interrupts at the completion of each of steps 1-3. An affirmative answer is indicated by a 1. Finally, field 348, comprising register bits 6-0, labelled "INT Vector", contains the address of the vector to which all interrupts will be directed, divided by 4. If this address is 0, then port interrupts will not be generated under any circumstances. If this field is non-zero the controller will generate initialization interrupts (if IE is set) and purge interrupts (if PI is set), and ring transition interrupts depending on the FLAG bit setting of the ring entry causing the transition.

The port/controller reads the SA register after it has been written by the host and then begins to run its full integrity check diagnostics; when finished, it conditionally interrupts the host as described above. (Step 350.)

Figure 12B:
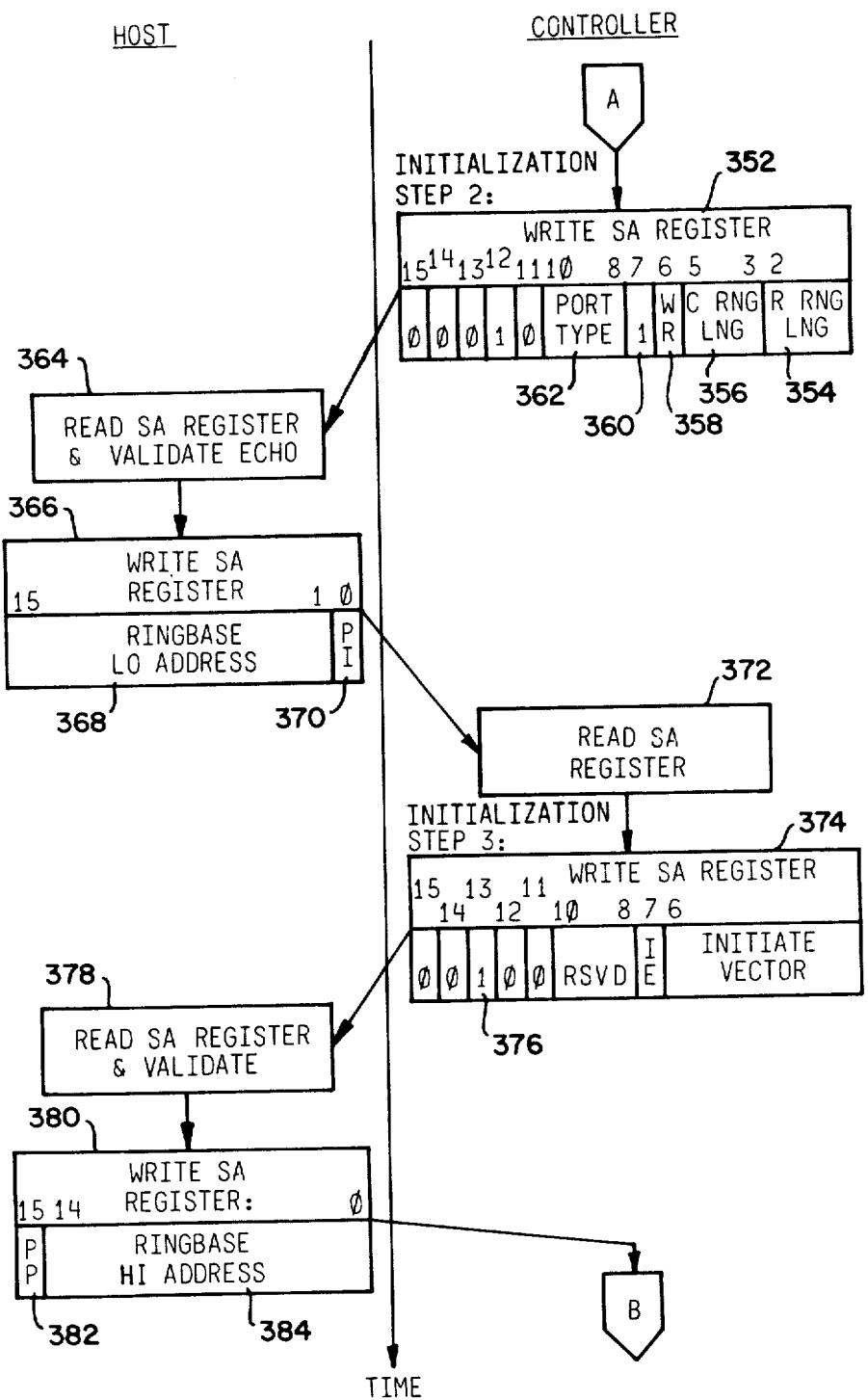
Figure 12C:
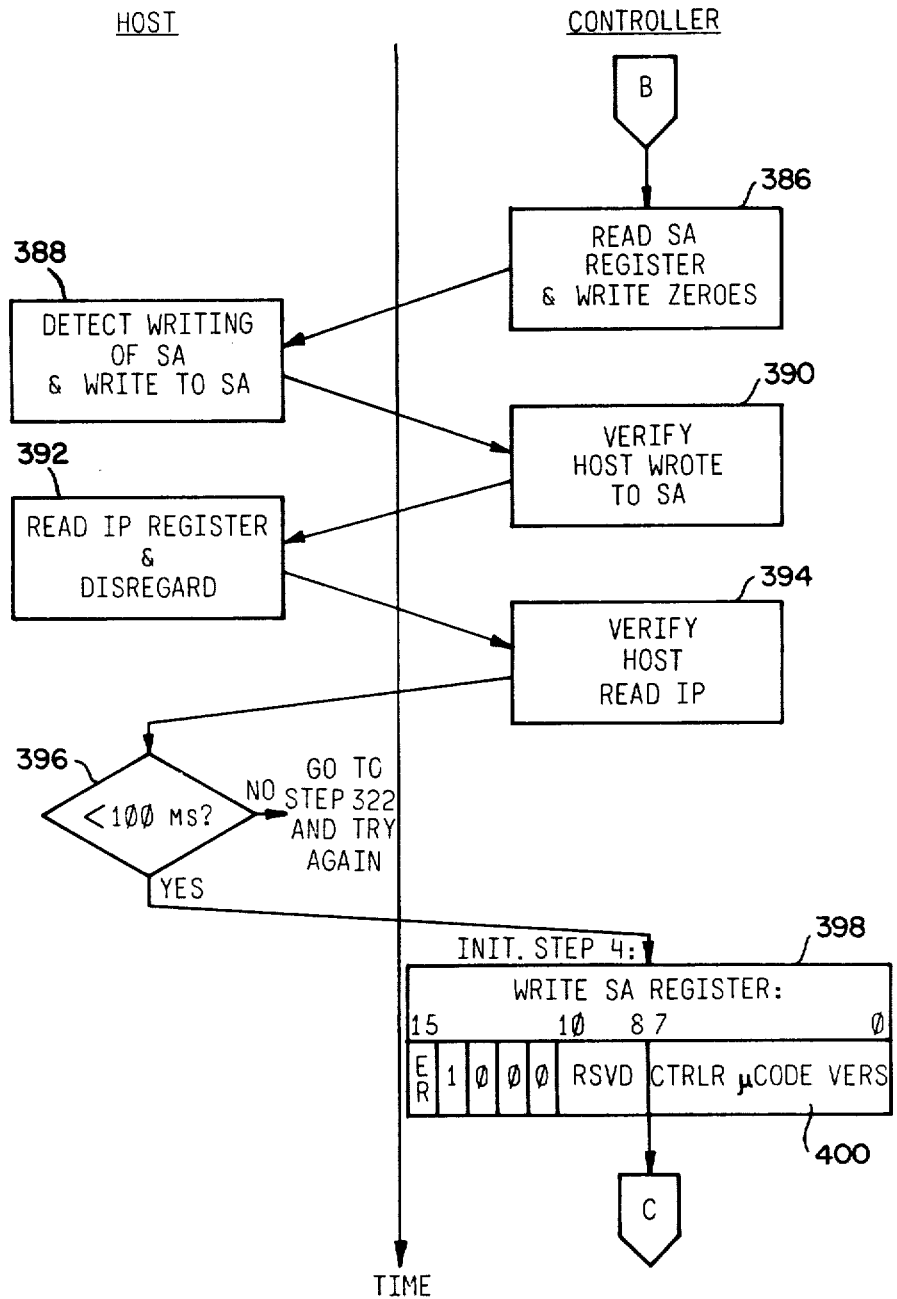
Figure 12D:
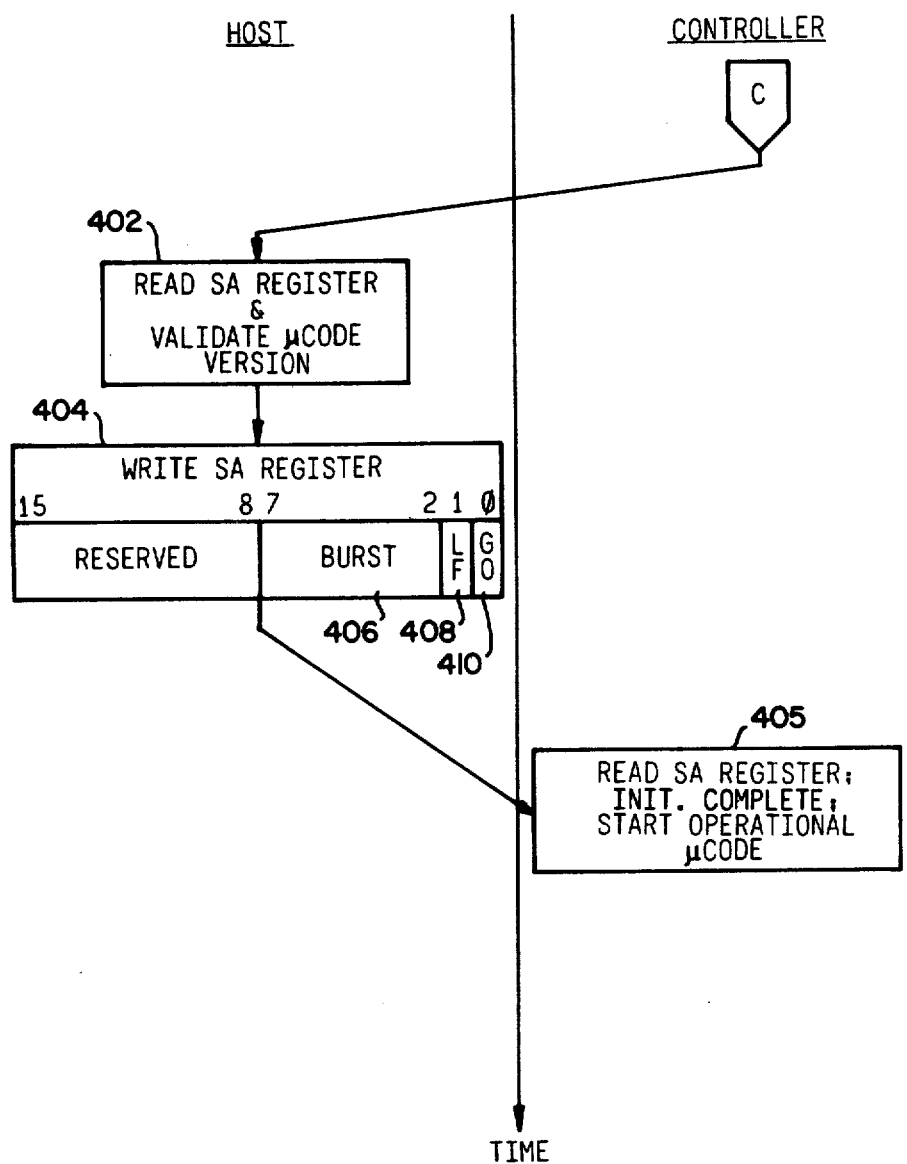

This completes step 1 of the initalization process. Next, the controller writes a pattern to the SA register as indicated in FIG. 12B. (Step 352.) As shown there, bits 7-0 of the SA register echo bits 15-8 in step 336. The response and command ring lengths are echoed in fields 354 and 356, respectively; bit 358 echoes the host's WR bit and bit 360 echoes the host's bit 15. The port type is indicated in field 362, register bits 10-8, and bit 12 is set to a 1 to indicate the beginning of step 2.

The host reads the SA register and validates the echo when it sees bit S2 change state. (Step 364.) If everything matches up, the host then responds by writing into the SA register the pattern indicated in step 366. Field 368, comprising SA register bits 15-1, labelled "ringbase lo addres", represents the low-order portion of the address of the word [ringbase+0] in the communications area. While this is a 16-bit byte address, its lowest order bit is 0, implicitly. The lowest order bit of the SA register, 370, indicated as "PI", when set equal to 1, means that the host is requesting adapter purge interrupts.

The controller reads the low ringbase address (Step 372) and then writes into the SA register the pattern indicated in step 374, which starts initialization step 3 by causing bit 376, the S3 bit, to undergo a transition from 0 to 1. The interrupt vector field 348 and interrupt enabling bit 346 from step 336 are echoed in SA register bits 7-0.

Next, the host reads the SA register and validates the echo; if the echo did not operate properly, an error is signalled. (Step 378). Assuming the echo was valid, the host then writes to the SA register the pattern indicated in step 380. Bit 382, the most significant bit, labelled "PP", is written with an indication of whether the host is requesting execution of "purge" and "poll" tests (described elsewhere); an affirmative answer is signaled by a 1. The port will ignore the PP bit if the DI bit 328 was zero at the beginning of step 1. The "ringbase hi address" field 384, comprising SA register bits 14-0, is the high-order portion of the address [ringbase+0].

The port then reads the SA register; if the PP bit has been set, the port writes zeroes into the SA register, to signal its readiness for the test. (Step 386.) The host detects that action and itself writes zeroes (or anything else) to the SA register, to simulate a "purge completed" host action. (Step 388.) After the port verifies that the host has written to the SA register (Step 390.), the host reads, and then disregards, the IP register. (Step 392.) This simulates a "start polling" command from the host to the port. The port verifies that the IP register was read, step 394, before the sequence continues. The host is given a predetermined time from the time the SA register was first written during initialization step 3 within which to complete these actions. (Step 396) If it fails to do so, initialization stops. The host may then restart the initialization sequence from the beginning.

Upon successful completion of intialization step 3, the transition to intialization step 4 is effectuated when the controller writes to the SA register the pattern indicated in step 398. Field 400, comprising bits 7-0 of the SA register, contains the version number of the port/controller microcode. In a microprogrammed controller, the functionality of the controller can be altered by changing the programming. It is therefore important that the functionality of the host and controller be compatible. The system designer can equip the host with the ability to recognize which versions of the controller microcode are compatible with the host and which are not. Therefore, the host checks the controller microcode version in field 400 and confirms that the level of functionality is appropriate to that particular host. (Step 402.) The host responds by writing into the SA register the pattern indicated in step 404. It is read by the controller in step 405 and 406 and the operational microcode is then started.

The "burst" field in bits 7-2 of the SA register is one less than the maximum number of longwords the host is willing to allow per NPR (nonprocessor involved) transfer. The port uses a default burst count if this field is zero. The values of both the default and the maximum the port will accept are controller-dependent. If the "LF" bit 408 is set equal to 1, that indicates that the host wants a "last fail" response packet when initialization is completed. The state of the LF bit 408 does not have any effect on the enabling/disabling of unsolicited responses. The meaning of "last fail" is explained below. The "GO" bit 410 indicates whether the controller should enter its functional microcode as soon as initialization completes. If GO=0, when initialization completes, the port will continue to read the SA register until the host forces bit 0 of that register to make the transition from 0 to 1.

At the end of initialization step 4, there is no explicit interrupt request. Instead, if interrupts were enabled, the next interrupt will be due to a ring transition or to an adapter purge request.

Diagnostic Wrap Mode

Diagnostic Wrap Mode (DWM) provides host-based diagnostics with the means for the lowest levels of host-controller communication via the port. In DWM, the port attempts to echo in the SA register 38 any data written to that register by the host. DWM is a special path through initialization step 1; initialization steps 2-4 are suppressed and the port/controller is left disconnected from the host. A hard initialization terminates DWM and, if the results of DWM are satisfactory, it is then bypassed on the next initialization sequence.

Last Fail

"Last fail" is the name given to a unique response packet which is sent if the port/controller detected an error during a previous "run" and the LF bit 405 was set in step 404 of the current initialization sequence. It is sent when initialization completes. The format of this packet is indicated in FIG. 3. The packet starts with 64 bits of zeros in a pair of 32 bit words 420. Next there is a 32 bit word 422 consisting of a lower-order byte 422A and a higher-order byte 422B, each of which has a unique numerical contents. Word 422 is followed by a double word 424 which contains a controller identifier. The packet is concluded by a single word 426. The higher-order byte 426A of word 426 contains an error code. The lower half of word 426 is broken into a pair of 8 bit fields 426B and 426C. Field 426B contains the controller's hardware revision number. Field 426C contains the controller's software, firmware or microcode revision number.

Submitted as Appendix A hereto is a listing of a disk class and port driver which runs under the VMS operating system of Digital Equipment Corp. on a VAX-11/780 computer system, and which is compatible with a secondary storage subsystem according to the present invention.

Recap

It should be apparent from the foregoing description that the present invention provides a versatile and powerful interface between host computers and peripheral devices, particularly secondary mass storage subsystems. This interface supports asynchronous packet type command and response exchanges, while obviating the need for a hardware-interlocked bus and greatly reducing the interrupt load on the host processor. The efficiency of both input/output and processor operation are thereby enhanced.

A pair of registers in the controller are used to transfer certain status, command and parametric information between the peripheral controller and host. These registers are exercised heavily during a four step initialization process. The meanings of the bits of these registers change according to the step involved. By the completion of the initialization sequence, every bit of the two registers has been checked and its proper operation confirmed. Also, necessary parametric information has been exchanged (such as ring lenths) to allow the host and controller to communicate commands and responses.

Although the host-peripheral communications interface of the invention comprises a port which, effectively, is controller-based, it nevertheless is largely localized at the host. Host-side port elements include: the command and response rings; the ring transition indicators; and, if employed, bus adapter purge control. At the controller, the port elements include: command and response buffers, host command and response ring pointers, and the SA and IP registers.

Having thus described the present invention, it will now be apparent that various alterations, modifications and improvements will readily occur to those skilled in the art. This disclosure is intended to embrace such obvious alterations, modifications and improvements; it is exemplary, and not limiting. This invention is limited only as required by the claims which follow the Appendix.

APPENDIX

Notes:

1. The mass storage controllers is referred to in this Appendix as "UDA"; thus, the IP register will appear as UDAIP, for example.
2. The term "MSCP" in this Appendix refers to the high-level I/O communication protocol.

```
    .SBITL   External and Local Symbol Definitions

.PAGE
;  ++
;  Define System Symbols
;  --

$CRBDEF              ; Channel Request Block Offsets
         $DDBDEF              ; Device Data Block Offsets
         $DPTDEF              ; Driver Prolog Table Offsets
         $IDBDEF              ; Interupt Data Block Offsets
         $IRPDEF              ; I/O Request Packet Offsets
         $UCBDEF              ; Unit Control Block Offsets
         $VECDEF              ; Interupt Vector Block Offsets $IPLDEF              ; Hardware IPL Definitions
         $IODEF               ; I/O Function Codes
         $SSDEF               ; System Status Codes
         $VADEF               ; Virtual Address field definitions ;  ++
;  The following symbols are placed here for quick reference. These values
;  are the determining factor for numerous symbol values defined below.
;  --

MSCP$K_EXPONENT  = 3           ; Base 2 exponential operator defining number
                               ; of ring and packet entries
MSCP$K_RINGSIZE  = 1<MSCP$K_EXPONENT>  ; Number of Ring & Packet entries ;  ++
;  Local Symbolic Offsets
;  --

;  Define Device I/O Page Registers $DEFINI  UDA
$DEF     UDAIP    .BLKW  1     ; Initialization and Polling Register
$DEF     UDASA    .BLKW  1     ; Status, Address, & VAX Purge ACK Register
         $DEFEND  UDA
```

```
; Define unit specific fields and sizes for UCBs $DEFINI UCB
.=UCBSW_ERRCNT+2
UCBSK_CLN_SIZE=.                                ; Size of Clone UCB
.=UCBSW_PCR+2
UCBSK_SIZE=.                                    ; Size of garden variety disk UCB
        $DEFEND UCB ; Define Generic/Transfer MSCP Command Packet offsets with internal header
; and trailer buffers $DEFINI PKT
$DEF    CPKESL_PQFL         .BLKL   1           ; MSCP Pkt queue forward link
$DEF    CPKESL_PQBL         .BLKL   1           ; MSCP Pkt queue backward link
$DEF    CPKESW_PKT_LEN      .BLKW   1           ; Packet Length descriptor
$DEF    CPKESW_VCID         .BLKW   1           ; Virtual Circuit I.D.

MSCPSK_PKT_HDR =.-CPKESL_PQFL                   ; Define size of packet header $DEF    MSCPSL_CMD_REF      .BLKL   1           ; Command Reference Number
$DEF    MSCPSW_UNIT         .BLKW   1           ; Unit number
                            .BLKW   1           ; Reserved word
$DEF    MSCPSB_OPCODE       .BLKB   1           ; Op Code
                            .BLKB   1           ; Reserved byte
$DEF    MSCPSW_MODIFIER     .BLKW   1           ; Command Modifiers
$DEF    MSCPSL_BYTE_CNT     .BLKL   1           ; Transfer byte Count
$DEF    MSCPSL_BUFFER       .BLKL   1           ; Buffer Descriptor (18 bits for UBA)
                            .BLKL   2           ; Un-used portion of buffer descriptor
$DEF    MSCPSL_LBN          .BLKL   1           ; Logical Block Number
$DEF    MSCPSL_SFT_WDS      .BLKL   1           ; Software words
                            .BLKL   3           ; Generic Packet Parameters Area
MSCPSK_PKTSIZE =.-MSCPSL_CMD_REF                ; Define size of generic MSCP Packet ; Define Driver Dependent Packet Trailer Offsets $DEF    CPKESL_RINGP        .BLKL   1           ; Pointer to associated ring entry
RESPSK_SIZE = .                                 ; Define size of internal response packet
CMDPSK_SIZE = .                                 ; Define size of internal command packet
        $DEFEND PKT ; Define Command Packet List Entry Offsets $DEFINI PKL
$DEF    CPKESL_CMD_REF      .BLKL   1           ; Command packet Reference number
$DEF    CPKESW_MAPREG       .BLKW   1           ; Number of 1st UBA Map Register
$DEF    CPKESB_NUMREG       .BLKB   1           ; Number of Map registers allocated
$DEF    CPKESB_DATAPATH     .BLKB   1           ; UBA Datapath number
$DEF    CPKESL_USERREF      .BLKL   1           ; User supplied reference number
                            .BLKB   <MSCPSK_PKTSIZE - 4> ; Remainder of MSCP pkt
CPKESK_SIZE = .                                 ; Command List entry size
        $DEFEND PKL CPKESK_LIST_LEN = 12        ; Current static Command Limit List Size by entries ; Define offsets in system buffer used by driver and UDA $DEFINI CC
$DEF    RESUSL_FLINK        .BLKL   1           ; Response ring/pkt que listhead
$DEF    RESUSL_BLINK        .BLKL   1
                            .BLKL   1           ; Buffer descriptor
$DEF    CMDUSL_FLINK        .BLKL   1           ; Command ring/pkt que listhead
$DEF    CMDUSL_BLINK        .BLKL   1
$DEF    INTPSL_FLINK        .BLKL   1           ; Internal packet wait que listhead
$DEF    INTPSL_BLINK        .BLKL   1
                            .BLKB   3           ; Unused, should be zero
$DEF    CMDSB_PURGE         .BLKB   1           ; UBA Channel for purge
$DEF    CMDSW_INTR          .BLKW   1           ; Command Interupt Flag
$DEF    RESSW_INTR          .BLKW   1           ; Response Interupt Flag
                                                ; Top of Response Ring Structures
$DEF    RESKSL_TOP          .BLKL   MSCPSK_RINGSIZE
                                                ; Top of Command Ring Structures
$DEF    CMDKSL_TOP          .BLKL   MSCPSK_RINGSIZE
                                                ; Top of Response packets
$DEF    RESPSL_TOP          .BLKB   <RESPSK_SIZE*MSCPSK_RINGSIZE>
                                                ; Top of Command packets
$DEF    CMDPSL_TOP          .BLKB   <CMDPSK_SIZE*MSCPSK_RINGSIZE>
                                                ; Clone UCB
$DEF    UCBS_CLONE          .BLKB   UCBSK_CLN_SIZE
                                                ; Active Command packet list
$DEF    ACTSL_CMD_LIST      .BLKB   <CPKESK_SIZE*CPKESK_LIST_LEN>
TBUFSK_SIZE =.                                  ; Total buffer size in bytes
        $DEFEND CC ; Define Local Data Structure offsets $DEFINI DD
$DEF    UDASL_BUFIOP        .BLKL   1           ; Top address of system buffer
$DEF    UDASL_CLONEUCB      .BLKL   1           ; Address of clone UCB
$DEF    UDASL_UCB_ZERO      .BLKL   1           ; Address of UCB 0
$DEF    UDASL_INTPQUE       .BLKL   1           ; Address of internal queue listhead
$DEF    UDASL_CMD_LIST      .BLKL   1           ; Address of Active Command Packet List
$DEF    UDASW_INIT_ERR      .BLKW   1           ; Init error reason flags
$DEF    UDASW_STEP_ERR      .BLKW   1           ; Init step error word
$DEF    UDASW_MAPREG        .BLKW   1           ; Mapping register of system buffer
$DEF    UDASB_NUMREG        .BLKB   1           ; Number of mapping registers
                            .BLKB   1           ; Datapath = 0
```

```
$DEF     UDA$W_BUFF        .BLKW    1       ; System buffer byte offset from page
$DEF     UDA$W_REF_NUM     .BLKW    1       ; Internal refernce number value
$DEF     UDA$W_FLAGS       .BLKW    1       ; Internal control flags
         $VIELD  UDA,0,<-                   ; Internal flag definitions
                 <ONLINE,,V>,-              ; UDA is On Line
                 <INTEXPCT,,V>,-            ; Interupt from UDA is expected
                 <S2EXPCT,,V>,-             ; Controller Init Step 2 interupt expected
                 <S3EXPCT,,V>,-             ; Controller Init Step 3 interupt expected
                 <S4EXPCT,,V>,-             ; Controller Init Step 4 interupt expected
                 <BUFALOC,,V>,-             ; System buffer is allocated
                 <BUFMAPD,,V>,-             ; System buffer is mapped in UBA
                 <PQUFD,,V>,-               ; Packet(s) available to be queued to UDA
                 <CLINKED,,V>,-             ; Clone UCB is linked into UCB list
                 <TIMEOUT,,V>,-             ; Timeout processing is in progress
                 >
UDA$K_SIZE = .                               ; Size of data structures required
         $DEFEND UU ;           NOTE 
         ; Beginning Offset Values
         ; parenthesized are in bytes decimal ; Abort and Get Command Status Command Packet specific Offset $DEFINI FF
.=MSCP$W_MODIFIER+2                          ; Offset (12)
$DEF     MSCP$L_OUT_REF    .BLKL    1        ; Outstanding Reference Number
         $DEFEND FF ; Online and Set Unit Characteristics Command Packet specific Offsets $DEFINI GG
.=MSCP$W_MODIFIER+4                          ; Offset (14)
                           .BLKW    1        ; Unit Flags
                           .BLKL    1        ; Host Identifier
                           .BLKL    2        ; Reserved
$DEF     MSCP$L_ERRLG_FL   .BLKL    1        ; Error Log Flags
                           .BLKW    1        ; Shadow Unit
$DEF     MSCP$W_COPY_SPD   .BLKW    1        ; Copy Speed
         $DEFEND GG ; Replace Command Packet specific offset $DEFINI HH
.=MSCP$W_MODIFIER+2                          ; Offset (12)
$DEF     MSCP$L_RBN        .BLKL    1        ; Replacement Block Number
         $DEFEND HH ; Set Controller Characteristics Command packet Specific Offsets $DEFINI II
.=MSCP$W_MODIFIER+2                          ; Offset (12)
$DEF     MSCP$W_VERSION    .BLKW    1        ; MSCP version
$DEF     MSCP$W_CNT_FLGS   .BLKW    1        ; Controller Flags
$DEF     MSCP$W_HST_TMO    .BLKW    1        ; Host Time Out
$DEF     MSCP$W_USE_FRAC   .BLKW    1        ; Use Fraction
$DEF     MSCP$Q_TIME       .BLKL    2        ; Quadword time and date
         $DEFEND II ; Define Response packet Offsets - Null Label Arguments are same
; as those defined in the Generic/Transfer Command Packet Above $DEFINI KK
                           .BLKL    2        ; Packet linkage long words
                           .BLKL    1        ; Packet length & Virtual Circuit Id
                           .BLKL    1        ; Command Reference Number
                           .BLKW    1        ; Unit Number
                           .BLKW    1        ; Reserved field
                           .BLKB    1        ; Op Code (also called opcode)
$DEF     MSCP$B_FLAGS      .BLKB    1        ; Flags field
$DEF     MSCP$W_STATUS     .BLKW    1        ; Status
                           .BLKL    1        ; Bytes transfered count
                           .BLKL    3        ; Reserved 3 long words
$DEF     MSCP$L_FRST_BAT   .BLKL    1        ; First Bad Block
                                             ; Software words
         $DEFEND KK ; Get Command packet End Packet Offsets $DEFINI LL
.=MSCP$L_OUT_REF+4                           ; Offset (16)
$DEF     MSCP$W_CMD_STS    .BLKW    1        ; Command Status
         $DEFEND LL ; Get Unit Status End packet Specific Offsets $DEFINI MM
.=MSCP$W_MODIFIER+2                          ; Offset (12)
$DEF     MSCP$W_MULT_UNT   .BLKW    1        ; Multi-Unit code
$DEF     MSCP$W_UNT_FLGS   .BLKW    1        ; Unit Flags
$DEF     MSCP$L_HOST_ID    .BLKL    1        ; Host identifier
$DEF     MSCP$Q_UNIT_ID    .BLKL    2        ; Unit identifier
$DEF     MSCP$L_MEDIA_ID   .BLKL    1        ; Media type identifier
$DEF     MSCP$W_SHDW_UNT   .BLKW    1        ; Shadow Unit
```

```
$DEF    MSCPSW_SHOW_SIS  .BLKW  1    ; Shadow Status
$DEF    MSCPSW_TRACK     .BLKW  1    ; Track Size
$DEF    MSCPSW_GROUP     .BLKW  1    ; Group Size
$DEF    MSCPSW_CYLINDER  .BLKW  1    ; Cylinder Size
                         .BLKW  1    ; Reserved
$DEF    MSCPSW_RCT_SIZE  .BLKW  1    ; RCT Table Size
$DEF    MSCPSB_RBNS      .BLKB  1    ; RBNS / Track
$DEF    MSCPSB_RCT_CPIS  .BLKB  1    ; RCT Copies
        $DEFEND MM ; Online & Set Unit Characteristics End Packet specific offsets $DEFINI NN
.=MSCPSW_SHOW_SIS+2                  ; Offset (36)
$DEF    MSCPSL_UNT_SIZE  .BLKL  1    ; Unit Size
$DEF    MSCPSL_VOL_SER   .BLKL  1    ; Volume Serial Number
        $DEFEND NN ; Set Controller Characteristics End packet Specific Offsets $DEFINI OO
.=MSCPSW_CNT_FLGS+2                  ; Offset (16)
$DEF    MSCPSW_CNT_TMO   .BLKW  1    ; Controller Timeout
$DEF    MSCPSW_CNT_CMDL  .BLKW  1    ; Controller Command Limit
$DEF    MSCPSQ_CNT_ID    .BLKL  2    ; Controller I.D.
        $DEFEND OO ; ++
; Local symbol definitions
; --

DEVICE_IPL    = 21          ; Device IPL
FORK_IPL      = 8           ; Fork IPL
LOOP_LIMIT    = ^X<FA8>     ; Step 1 maximum wait time for response
INTR_VEC      = ^O<270>     ; Primary Interupt vector ; Define Initialization Sequence UDASA bit flags INIT_M_STEP4  = ^X4000      ; Step 4 indicator mask
INIT_M_STEP3  = ^X2000      ; Step 3 indicator mask
INIT_M_STEP2  = ^X1000      ; Step 2 indicator mask
INIT_M_STEP1  = ^X800       ; Step 1 indicator mask
INIT_M_INTI   = ^X80        ; Initialization sequence interupt enable
INIT_M_INIF   = 4           ; Enable fatal error interupt flag
INIT_M_LFAIL  = 2           ; Request previous failure log message packet
INIT_M_PURGE  = 1           ; Enable purge flag
INIT_M_GO     = 1           ; Go flag INIT_V_ERROR  = ^XF         ; Initialization Error
INIT_V_STEP4  = ^XE         ; Step 4 indicator bit
INIT_V_STEP3  = ^XD         ; Step 3 indicator bit
INIT_V_STEP2  = ^XC         ; Step 2 indicator bit
INIT_V_STEP1  = ^XB         ; Step 1 indicator bit ; Initialization Sequence Step word formats STEP_1_WRITE = <1@15>!<MSCPSK_EXPONENT@11>!<MSCPSK_EXPONENT@8>!INIT_M_INTI!<1.0
STEP_2_READ  = INIT_M_STEP2!<1@7>!<MSCPSK_EXPONENT@3>!MSCPSK_EXPONENT
STEP_3_READ  = INIT_M_STEP3!INIT_M_INTI!<INTR_VEC/4>

; Command and Message Ring Control Flags

UDA_M_OWN   = 1@31          ; Own flag mask
UDA_M_FLAG  = 1@30          ; Buffer control flag mask
UDA_V_OWN   = ^X1F          ; Own flag vector
UDA_V_FLAG  = ^X1F          ; Buffer control flag vector ; Direct MSCP Packet I/O Function Codes

IOS_MSCP_PKT = IOS_NOP

; Control Packet Opcodes
;
; Command Opcode bits 3 thru 5 indicate the command class:
;     000 Immediate Commands
;     001 Sequential Commands
;     010 Non-sequential commands that do not include a buffer descriptor
;     011 Maintenance Commands
;     100 Non-sequential commands that include a buffer descriptor
;
; End packet Opcodes (also called Endcodes) are formed by adding the end packet
; flag (200 octal) to the corresponding command packets Opcode. An unkn
; command End packet contains just the flag in the packet's Opcode field.

MSCPSK_OP_ABORT  = 1    ; ^O01,  ^X01   ABORT Command
MSCPSK_OP_ACCES  = 10   ; ^O20,  ^X10   ACCESS Command
MSCPSK_OP_AVAIL  = 8    ; ^O10,  ^X08   AVAILABLE Command
MSCPSK_OP_CMPCD  = 17   ; ^O21,  ^X11   COMPARE CONTROLLER DATA Command
MSCPSK_OP_COMP   = 32   ; ^O40,  ^X20   COMPARE HOST DATA Command
MSCPSK_OP_ERASE  = 18   ; ^O22,  ^X12   ERASE Command
MSCPSK_OP_FLUSH  = 19   ; ^O23,  ^X13   FLUSH Command
MSCPSK_OP_GTCMD  = 2    ; ^O02,  ^X02   GET COMMAND STATUS Command
MSCPSK_OP_GTUNT  = 3    ; ^O03,  ^X03   GET UNIT STATUS Command
MSCPSK_OP_ONLIN  = 9    ; ^O11,  ^X09   ONLINE Command
```

```
MSCPSK_OP_READ   = 33     ; ^041, ^X21   READ Command
MSCPSK_OP_REPLC  = 20     ; ^024, ^X14   REPLACE Command
MSCPSK_OP_STCON  = 4      ; ^004, ^X04   SET CONTROLLER CHARACTERISTICS Command
MSCPSK_OP_STUNT  = 10     ; ^012, ^X0A   SET UNIT CHARACTERISTICS Command
MSCPSK_OP_WRITE  = 34     ; ^042, ^X22   WRITE Command
MSCPSK_OP_END    = 128    ; ^200, ^X80   END PACKET FLAG
MSCPSK_OP_SEREX  = 7      ; ^07,  ^X7    SERIOUS EXCEPTION END PACKET
MSCPSK_OP_AVAIN  = 64     ; ^100, ^X40   AVAILABLE Attention Message
MSCPSK_OP_DUPUN  = 65     ; ^101, ^X41   DUPLICATE UNIT NUMBER Attention Message
MSCPSK_OP_ACPTH  = 66     ; ^102, ^X42   ACCESS PATH Attention Message MSCPSM_OP_END    = ^X80   ; End Packet Mask
MSCPSV_OP_END    = 7      ; End Packet Bit Flag
MSCPSM_OP_ATTN   = ^X40   ; Attention Message Command Mask
MSCPSV_OP_ATTN   = 6      ; Attention Message Command Bit MSCPSV_OP_READ   = 0      ; Read command bit flag
MSCPSV_OP_XFER   = 5      ; Data Transfer type MSCP Opcode bit ; End Packet Flags (mask values)

MSCPSM_EF_BBLKR  = ^X80   ; Bad Block Reported
MSCPSM_EF_BBLKU  = ^X40   ; Bad Block Unreported
MSCPSM_EF_ERLOG  = ^X20   ; Error Log generated
MSCPSM_EF_SEREX  = ^X10   ; Serious exception ; End Packet Flags (vector values)

MSCPSV_EF_BBLKR  = 7      ; Bad Block Reported
MSCPSV_EF_BBLKU  = 6      ; Bad Block Unreported
MSCPSV_EF_ERLOG  = 5      ; Error Log generated
MSCPSV_EF_SEREX  = 4      ; Serious exception ; Controller Flags (mask values)

MSCPSM_CF_AVATN  = ^X80   ; Enable Available Attention Messages
MSCPSM_CF_MISC   = ^X40   ; Enable miscellaneous Error Log Messages
MSCPSM_CF_OTHER  = ^X20   ; Enable other host's Error Log Messages
MSCPSM_CF_THIS   = ^X10   ; Enable this host's Error Log Messages
MSCPSM_CF_SHADW  = 2      ; Shadowing
MSCPSM_CF_576    = 1      ; 576 Byte Sectors ; Controller Flags (mask values)

MSCPSV_CF_AVATN  = 7      ; Enable Available Attention Messages
MSCPSV_CF_MISC   = 6      ; Enable miscellaneous Error Log Messages
MSCPSV_CF_OTHER  = 5      ; Enable other host's Error Log Messages
MSCPSV_CF_THIS   = 4      ; Enable this host's Error Log Messages
MSCPSV_CF_SHADW  = 1      ; Shadowing
MSCPSV_CF_576    = 0      ; 576 Byte Sectors ; Status and Event Codes MSCPSM_ST_MASK   = ^X1F   ; Status / Event code mask
MSCPSV_ST_MASK   = 0      ; Status / Event code (start of field)
MSCPSS_ST_MASK   = 5      ; Status / Event code (field size)

MSCPSK_ST_SBCOD  = ^X20   ; Sub-code multiplier
MSCPSK_ST_SUCC   = 0      ; Success
MSCPSK_ST_ICMD   = 1      ; Invalid Command
MSCPSK_ST_ABRTD  = 2      ; Command Aborted
MSCPSK_ST_OFFLN  = 3      ; Unit Off-Line
MSCPSK_ST_AVLBL  = 4      ; Unit Available
MSCPSK_ST_MFMTE  = 5      ; Media Format Error
MSCPSK_ST_WRTPR  = 6      ; Write Protected
MSCPSK_ST_COMP   = 7      ; Compare Error
MSCPSK_ST_DATA   = 8      ; Data Error
MSCPSK_ST_HSTBF  = 9      ; Host buffer access error
MSCPSK_ST_CNTRL  = ^XA    ; Controller Error
MSCPSK_ST_DRIVE  = ^XB    ; Drive Error
MSCPSK_ST_DIAG   = ^X1F   ; Message from an internal diagnostic ; Define QIO Parameters (AP) offsets P1 = 0                    ; First QIO Parameter
P2 = 4                    ; Second QIO Parameter
P3 = 8                    ; Third QIO Parameter
P4 = 12                   ; Fourth QIO Parameter
P5 = 16                   ; Fifth QIO Parameter
P6 = 20                   ; Sixth QIO Parameter .SBTTL  Tables
        .PAGE
;++
; Driver Prologue Table
;--
        DPTAB   -
                END=UDA_END,-              ; End of Driver
                ADAPTER=UBA,-              ; Unibus Adapter Type
                FLAGS=0,-                  ; No System Page required
                UCBSIZE=UCBSK_SIZE,-       ; UCB Size
                UNLOAD=UDA_UNLOAD,-        ; Driver Unload routine
                NAME=DUDRIVER              ; Driver Name
        DPT_STORE INIT                     ; Control Block Init values
        DPT_STORE DUP,DDBSK_ACPD,L,<^A\F11\>  ; Default ACP Name
```

```
        DPT_STORE  DDB,DDBSL_ACPD+3,B,3      ; ACP Class
        DPT_STORE  UCB,UCBSB_FIPL,B,FORK_IPL ; Fork IPL
        DPT_STORE  UCB,UCBSL_DEVCHAR,L,-     ; Device Characteristics
                    <DEVSM_FOD-                 ; Files Oriented
                     !DEVSM_DIR-                ; Directory Structured
                     !DEVSM_AVL-                ; Available
                     !DEVSM_SHR-                ; Sharable
                     !DEVSM_IDV-                ; Input Device
                     !DEVSM_ODV-                ; Output Device
                     !DEVSM_RND>                ; Random Access
        DPT_STORE  UCB,UCBSB_SECTORS,B,31    ; RA80 Sectors per track
        DPT_STORE  UCB,UCBSB_TRACKS,B,14     ; RA80 Tracks per cylinder
        DPT_STORE  UCB,UCBSW_CYLINDERS,W,547 ; RA80 user area cylinders
        DPT_STORE  UCB,UCBSB_DEVCLASS,B,DC$_DISK ; Device Class
        DPT_STORE  UCB,UCBSW_DEVBUFSIZ,W,512 ; Default Buffer Size
        DPT_STORE  UCB,UCBSB_DIPL,B,DEVICE_IPL ; Device IPL
        DPT_STORE  UCB,UCBSW_STS,W,UCBSM_ONLINE ; Set units online
        DPT_STORE  UCB,UCBSW_DEVSTS,W,-
                    <UCBSM_NOCNVRT-              ; No LBN to physical addr conversion
                     !UCBSM_DIAGBUF>             ; Diagnostic buffer specified
        DPT_STORE  UCB,UCBSL_MAXBLOCK,L,-    ; RA80 Max LBNS
                    237398
        DPT_STORE  REINIT                     ; Control Block Re-Init Values
        DPT_STORE  DDB,DDBSL_DDT,D,DUSDDT    ; Driver Dispatch Table Addr
        DPT_STORE  CRB,CRBSL_INTD+4,D,-      ; Address of interupt service routine
                    UDA_INTERUPT

DPT_STORE  END

; ++
; Driver Dispatch Table
; --

DDTAB   -
                DU,-                            ; Device Name
                UDA_STARTIO,-                   ; Start I/O routine
                0,-                             ; No Secondary Level Interupt
                UDA_FUNCTABLE,-                 ; Function Decision Table
                0,-                             ; Cancel I/O
                0,-                             ; Error Logging Routine
                MSCPSK_PKTSIZE+12,-             ; Diag Buff byte length
                0                               ; Size of error buffer ; Internal data structures

UDASL_INTERNAL: .BLKB   UDA$K_SIZE

.SBTTL  UDA Function Decision Table
        .PAGE
; ++
; Driver Function Decision Table
; --

UDA_FUNCTABLE:
        FUNCTAB ,-                              ; Legal Function Masks
                <NOP,-                          ; Direct MSCP Packet Function
                 INITIALIZE,-                   ; UDA and units Initialization command
                 SEEK,-                         ; Seek
                 SENSECHAR,-                    ; Sense Characteristics
                 SENSEMODE,-                    ; Sense Mode
                 SETMODE,-                      ; Set Mode
                 SETCHAR,-                      ; Set Characteristics
                 READLBLK,-                     ; Read Logical Block
                 READPBLK,-                     ; Read Physical Block
                 READVBLK,-                     ; Read Virtual Block
                 WRITELBLK,-                    ; Write Logical Block
                 WRITEPBLK,-                    ; Write Physical Block
                 WRITEVBLK,-                    ; Write Virtual Block
                 ACCESS,-                       ; Access file and/or directory entry
                 ACPCONTROL,-                   ; ACP Control Function
                 CREATE,-                       ; Create file and/or directory
                 DEACCESS,-                     ; Deaccess file
                 DELETE,-                       ; Delete file and/or directory
                 MODIFY,-                       ; Modify file attributes
                 MOUNT,-                        ; Mount Volume
                 READHEAD,-                     ; Read head
                 WRITECHECK,-                   ; Write Check
                 WRITEHEAD>                     ; Write Head
        FUNCTAB ,-                              ; Buffered I/O Functions
                <SENSECHAR,-                    ; Sense Characteristics
                 SENSEMODE,-                    ; Sense Mode
                 SETMODE,-                      ; Set Mode
                 SETCHAR,-                      ; Set Characteristics
                 ACCESS,-                       ; Access file and/or directory entry
                 ACPCONTROL,-                   ; ACP Control Function
                 CREATE,-                       ; Create file and/or directory
                 DEACCESS,-                     ; Deaccess file
                 DELETE,-                       ; Delete file and/or directory
                 MODIFY,-                       ; Modify file attributes
                 MOUNT>                         ; Mount Volume
        FUNCTAB UDA_FDT_INIT,<INITIALIZE>       ; UDA Initialization
        FUNCTAB UDA_FDT_TESTONL,-               ; Test UDA for online
                <NOP,-                          ; Direct MSCP Packet Function
                 READLBLK,-                     ; Read Logical Block
```

```
                    READPBLK,-              ; Read Physical Block
                    READVBLK,-              ; Read Virtual Block
                    SEEK,-                  ; Seek
                    WRITELBLK,-             ; Write Logical Block
                    WRITEPBLK,-             ; Write Physical Block
                    WRITEVBLK,-             ; Write Virtual Block
                    ACCESS,-                ; Access file and/or directory entry
                    ACPCONTROL,-            ; ACP Control Function
                    CREATE,-                ; Create file and/or directory
                    DEACCESS,-              ; Deaccess file
                    DELETE,-                ; Delete file and/or directory
                    MODIFY,-                ; Modify file attributes
                    MOUNT,-                 ; Mount Volume
                    READHEAD,-              ; Read Head
                    WRITECHECK,-            ; Write Check
                    WRITEHEAD>              ; Write Head
        FUNCTAB UDA_FDT_MSCP,<NOP>          ; Direct MSCP Packet
        FUNCTAB UDA_FDT_BYTECNT,-           ; Even byte count required functions
                    <READLBLK,-             ; Read Logical Block
                    READPBLK,-              ; Read Physical Block
                    READVBLK,-              ; Read Virtual Block
                    WRITELBLK,-             ; Write Logical Block
                    WRITEPBLK,-             ; Write Physical Block
                    WRITEVBLK>              ; Write Virtual Block
        FUNCTAB UDA_FDT_PHYSIO,-            ; Physical I/O request functions
                    <READPBLK,-             ; Read Physical Block
                    WRITEPBLK>              ; Write Physical Block
        FUNCTAB UDA_FDT_NOP,-               ; No operation for current version
                    <READHEAD,-             ; Read Head
                    SEEK,-                  ; Seek
                    WRITEHEAD,-             ; Write Head
                    WRITECHECK>             ; Write Check
        FUNCTAB +ACPSREADBLK,-              ; ACP Read Functions
                    <READLBLK,-             ; Read Logical Block
                    READPBLK,-              ; Read Physical Block
                    READVBLK>               ; Read Virtual Block
        FUNCTAB +ACPSWRITEBLK,-             ; ACP Write Functions
                    <WRITELBLK,-            ; Write Logical Block
                    WRITEPBLK,-             ; Write Physical Block
                    WRITEVBLK>              ; Write Virtual Block
        FUNCTAB +ACPSACCESS,-               ; ACP Access or create file/directory
                    <ACCESS,CREATE>
        FUNCTAB +ACPSDEACCESS,<DEACCESS>
        FUNCTAB +ACPSMODIFY,-
                    <ACPCONTROL,-
                    DELETE,-
                    MODIFY>
        FUNCTAB +ACPSMOUNT,<MOUNT>
        FUNCTAB +EXESSENSEMODE,-
                    <SENSECHAR,-            ; Sense Characteristics
                    SENSEMODE>              ; Sense Mode
        FUNCTAB +EXESSETCHAR,-
                    <SETMODE,-              ; Set Mode
                    SETCHAR>                ; Set Characteristics .SBTTL  FDT Routines
        .PAGE
        .ENABLE LSB
;++
; Functional Description:
;
; Refer to specific FDT routines.
;
; Inputs: (common to all FDT routines)
;
;       R3 = Address of IRP (I/O Request Packet)
;       R4 = Address of PCB (Process Control Block)
;       R5 = Address of UCB (Unit Control Block)
;       R6 = Address of CCB (Channel Control Block)
;       R7 = Bit Number of the I/O Function Code
;       R8 = Address of the FDT Table entry for the specific FDT Routine
;       AP = Address of the first function dependent QIO Parameter
;
;--

UDA_FDT_TESTONL:
        MOVAB   UDASL_INTERNAL,R2           ; Get address of internal structures
        BLBS    UDASW_FLAGS(R2),10S         ; Controller is presumeable online
        MOVL    UDASW_INIT_ERR(R2),R1       ; Load init error flags
5S:     MOVZWL  #SS$_SSFAIL,R0              ; Set sub-system failure status
        BRB     110S                        ; Finish I/O
10S:    MOVL    UCBSL_CRB(R5),R0            ; Get address of CRB
        MOVL    CRBSL_INTD+VECSL_IDB(R0),R0 ; Get address of IDB
        MOVL    (R0),R0                     ; Get address of CSR
        MOVZWL  UDASA(R0),R1                ; Test if UDA died since last I/O
        BEQL    15S                         ; No
        BBSC    #UDASV_ONLINE,-             ; Reset controller online and Finish
                UDASW_FLAGS(R2),5S          ; I/O
15S:    BICW2   #UCBSM_BSY,UCBSW_STS(R5)    ; Clear unit busy to avoid a wait
20S:    RSB                                 ; Return to EXESQIO
        .PAGE
;++
; UDA_FDT_BYTECNT
;
```

```
UDA_FDT_BYTECNT:
            BBC       #0,P2(AP),20S           ; Return if byte count is even
105S:       MOVZWL    #SSS_IVBUFLEN,R0        ; Set bad byte count status
110S:       JMP       G^EXF$FINISHIO          ; Finish I/O
            .PAGE
; ++
; UDA_FDT_MSCP UDA_FDT_MSCP:
            MOVL      P1(AP),R0               ; Get address of user's MSCP pkt
            MOVL      #MSCP$K_PKTSIZE+12,R1   ; Load length of an MSCP pkt + header
            DSBINT    #IPL$_SYNCH             ; Synch access to system data base
            BSBW      UDA_ALONONPAGED         ; Allocate a system buffer
            ENBINT                            ; Return to previous IPL
            BLBC      R0,215S                 ; Insufficient resources, abort I/O
            MOVL      R2,IRP$L_MEDIA(R3)      ; Load MSCP Packet buffer address in i
            MOVL      P1(AP),R0               ; Get address of user's MSCP pkt
            CLRL      R1                      ; Clear index
200S:       MOVL      (R0)[R1],12(R2)[R1]     ; Copy MSCP packet into hold buffer
            ADBLSS    #MSCP$K_PKTSIZE+8-3,R1,200S
            BBS       #MSCP$V_OP_XFER,-
                      MSCP$B_OPCODE(R2),205S  ; Process transfer I/O functions
204S:       JMP       G^EXF$QIODRVPKT         ; Queue packet to driver
205S:       MOVL      MSCP$L_BUFFER(R2),P1(AP) ; Load xfer address in I/O parameter 1
            MOVL      MSCP$L_BYTE_CNT(R2),P2(AP) ; Load xfer byte count
            BEQL      204S                    ; It's a UDA seek command
            BBS       #MSCP$V_OP_READ,-
                      MSCP$B_OPCODE(R2),210S  ; Opcode is a read class command
209S:       JMP       G^EXF$WRITE             ; Process direct I/O write
210S:       JMP       G^EXF$MODIFY            ; Process direct I/O read
215S:       JMP       G^EXF$ABORTIO           ; Abort I/O
            .PAGE
; ++
; UDA_FDT_NOP UDA_FDT_NOP:
            MOVL      S^#SSS_NORMAL,R0        ; Set normal return status
            JMP       G^EXF$FINISHIOC         ; Finish I/O ; ++
; UDA_FDT_PHYSIO
;
; This routine is called when a physical I/O request was received. The physical
; disk address in parameter 3 of the parameters list is converted to a logical
; block number, recognizable by the UDA. The algorithm for conversion is:
;
;       LBN  =  (cylinder * (sectors per track * tracks per cylinder))
;               + (track * sectors per track)
;               + sector
; --
UDA_FDT_PHYSIO:
            MOVZBL    UCBSB_SECTORS(R5),R0    ; Develop LBNs/cylinder value
            MOVZBL    UCBSB_TRACKS(R5),R1
            MULL2     R0,R1                   ; R1 = LBNs/cylinder, R0 = sectors/track
            EXTZV     #16,#16,P3(AP),R2       ; Get physical cylinder value
            MULL2     R2,R1                   ; Multiply cylinder by LBNs/cylinder
            EXTZV     #8,#8,P3(AP),R2         ; Get physical track number
            MULL2     R0,R2                   ; Multiply by sectors/track
            ADDL2     R2,R1                   ; Add sector/track to above
            EXTZV     #0,#8,P3(AP),R2         ; Get physical sector number
            ADDL2     R2,R1                   ; result is the equivalent LBN
            MOVL      R1,IRP$L_MEDIA(R3)      ; Stuff in LBN area of IRP
            CMPZV     #IRPSV_FCODE,#IRPSS_FCODE,- ; Is this a read ?
                      IRPSW_FUNC(R3),#IO$_READPBLK
            BEQL      210S                    ; Yes, goto EXF$MODIFY
            BRB       209S                    ; Goto EXF$WRITE
            .PAGE
; ++
; UDA_FDT_INIT
;
; Functional Description:
;
; This routine is called when a hard initialize of the UDA is requested. I
; basically mimmics the functions of the SYSGEN process by loading th
; appropriate registers with the values that SYSGEN would normally load.  I
; addition  it  disables  all  interupts  and  calls  the  primary level o
; initialization routine.  Upon return to this FDT routine, original FDT contex
; is  restored,  interupts  are enabled back to ground 0, and the I/O request )
; terminated.
; --
```

```
UDA_FDT_INIT:
        DSBINT                                  ; Disable all interupts
        PUSHR   #^M<R3,R4,R5,R6,R8>             ; Save FDT Context
        MOVL    UCBSL_CRB(R5),R8                ; Get address of CRB
        MOVL    UCBSL_DDB(R5),R6                ; Load R6 with addr of DDB
        MOVL    CRBSL_INTD+VECSL_IDB(R8),R5     ; Get address of IDB
        MOVL    (R5),R4                         ; Load CSR address in R4
        BSBW    UDA_INITIALIZE                  ; Go and init the UDA
        POPR    #^M<R3,R4,R5,R6,R8>             ; Restore FDT context
        ENBINT                                  ; Enable interupts
        BRB     UDA_FDT_NOP                     ; Finish the I/O

.DISABLE LSB

.SBTTL  UDA_STARTIO - UDA Start I/O routine
        .PAGE
;++
; UDA_STARTIO - UDA driver start I/O routine
;
; Inputs:
;       R3 = Address of I/O Request packet
;       R5 = Address of specified Unit Control block
;
; Register assignments:
;       R0 = Address of MSCP Packet
;       R1 = Address of Internal data structures
;       R2 = Address of Active MSCP Packet list entry
;       R3 = Address of IRP or Internal Packet being serviced
;       R4 = General work Register
;       R5 = Address of input queue and fork block (clone) UCB
;       R6 = General work Register
;
;       R7 = Scratch
;       R8 = Scratch
;--
        .ENABLE LSB UDA_STARTIO:
        MOVAB   UDASL_INTERNAL,R1               ; Get address of Internal buffer
        MOVL    UDASL_CLONEUCB(R1),R2           ; Get address of IRP queue UCB
        MOVAB   UCBSL_IOQFL(R2),R2              ; Get address of queue listhead
        PUSHL   R1                              ; Save Internals buffer address
        JSB     G^EXE$INSERTIRP                 ; Insert IRP in input queue
        POPL    R1                              ; Retrieve Internals buffer address UDA_INTERNAL_IO:                                ; Reference Label for Internal MSCP
                                                ; packet queueing to UDA @ fork IPL
        PUSHR   #^M<R6,R7,R8>                   ; Save registers
        MOVL    UDASL_CLONEUCB(R1),R5           ; Get address of clone UCB
5$:     JSB     GET_CMD_PACKET                  ; Get next empty Command packet
        BBS     #VA$V_SYSTEM,R0,6$              ; Got one
        BRW     5$5$                            ; Rings are full, close out
6$:     MOVL    UDASL_INTPQUE(R1),R3            ; Get address of internal queue listhd
        REMQUE  @(R3),R4                        ; Get next internal packet for UDA
        BVS     8$                              ; None there, try outside I/O request
        CLRL    R8                              ; Clear index
7$:     MOVQ    12(R4)[R8],MSCPSL_CMD_REF(R0)[R8] ; Copy packet to ring buffer
        AOBLSS  #MSCPSK_PKTSIZE@-3,R8,7$
        MOVL    MSCPSL_CMD_REF(R0),-            ; Copy command refence number into
                CPKFSL_CMD_REF(R2)              ; Active packet list entry
        BISW2   #UDASM_PQUED,UDASW_FLAGS(R1)    ; Set a packet was queued flag
        JSB     @(SP)+                          ; Queue packet to UDA
        MOVL    R4,R0                           ; Get address of temporary buffer
        BSBW    UDA_DEANONPAGED                 ; De-allocate system buffer
        INCL    UCBSL_OPCNT(R5)                 ; Account for queued I/O in Clone UCB
        BRB     5$                              ; Start again
8$:     MOVAB   UCBSL_IOQFL(R5),R4              ; Get address of IRP queue listhead
        CMPL    (R4),R4                         ; Is the queue empty ?
        BEQL    31$                             ; Yes, exit
        MOVL    (R4),R3                         ; Get address of IRP to process
        MOVL    IRPSL_UCB(R3),R6                ; Get address of associated UCB
        TSTW    IRPSW_FUNC(R3)                  ; Is this a direct MSCP packet I/O
        BNEQ    15$                             ; No
        MOVL    IRPSL_MEDIA(R3),R7              ; Get address of packets temp storage
        CLRL    R8                              ; Clear index
10$:    MOVQ    12(R7)[R8],MSCPSL_CMD_REF(R0)[R8]   ; Copy packet to ring buffer
        MOVQ    12(R7)[R8],CPKFSL_USERREF(R2)[R8]   ; and into active pkt list
        AOBLSS  #MSCPSK_PKTSIZE@-3,R8,10$
        BES     #MSCPSV_OP_XFER,-
                MSCPSB_OPCODE(R0),11$           ; Process data transfer MSCP pkt
        BSBW    CHECK_ABORT                     ; ** check for abort or get cmd stst
        BRB     40$
11$:    TSTL    MSCPSL_BYTE_CNT(R0)             ; Is this a seek packet byte count = 0
        BNEQ    25$                             ; No
        BRB     40$                             ; Yes, uneue packet as is 15$:    MOVB    #MSCPSK_OP_READ,R7              ; Assume a read function
        CMPZV   #IRPSV_FCODE,#IRPSS_FCODE,-     ; Is it really a read ?
                IRPSW_FUNC(R3),#IOS_READPBLK
        BEQL    20$                             ; Yes
        MOVB    #MSCPSK_OP_WRITE,R7             ; Load a write op code
20$:    MOVB    R7,MSCPSB_OPCODE(R0)            ; Load op code in command packet
        MOVL    IRPSL_MEDIA(R3),-               ; Load LBN
                MSCPSL_LBN(R0)
        MOVW    UCBSW_UNIT(R6),-                ; Load Unit Number of associated UCB
                MSCPSW_UNIT(R0)
```

```
              MOVZWL    IRPSW_BCNT(R3),-              ; Load transfer byte count
                        MSCPSL_BYTE_CNT(R0)
              BEQL      40$                           ; No byte count, seek only
25$:          PUSHR     #^M<R0,R1,R2,R4>              ; Save registers from destruction
              MOVC      IRPSL_SVAPTE(R3),UCBSL_SVAPTE(R5) ; Load xfer parameters in UCB
              JSB       G^IOCSREQDATAPNW              ; Request a buffered data path
              BLBC      R0,30$                        ; None available
              JSB       G^IOCSALOURAMAP               ; Allocate UBA mapping registers
              BLBS      R0,35$                        ; Good return
              JSB       G^IOCSRELDATAP                ; Release buffered data path
30$:          POPR      #^M<R0,R1,R2,R4>              ; Restore registers
31$:          TSTL      (SP)+                         ; Clear return address to queue cmd pkt
              BRB       55$                           ; Clean up and leave
35$:          JSB       G^IOCSLOADUBAMAP              ; Load UBA mapping registers
              POPR      #^M<R0,R1,R2,R4>              ; Restore registers
              MOVL      UCBSL_CRB(R5),R7              ; Get address of CRB
              MOVL      CRBSL_INTD+VECSW_MAPREG(R7),- ; Save UBA Mapping context
                        CPKESW_MAPREG(R2)             ; In active packet List Entry
              MOVZWL    IRPSW_BOFF(R3),R8             ; Kludge up xfer address for UDA
              INSV      CRBSL_INTD+VECSW_MAPREG(R7),#9,#9,R8 ; Load map register nur
              INSV      CRBSL_INTD+VECSB_DATAPATH(R7),#24,#8,R8 ; Load Data Path
              MOVL      R8,MSCPSL_BUFFER(R0)          ; Stuff in MSCP command packet
40$:          MOVL      R3,MSCPSL_CMD_REF(R0)         ; Load IRP address as reference number
              MOVL      R3,CPKESL_CMD_REF(R2)         ; In MSCP Packet and List Entry
              JSB       @(SP)+                        ; Queue packet to UDA
              TSTW      IRPSW_FUNC(R3)                ; Was this a direct MSCP I/O
              BNEQ      45$                           ; No
              MOVL      IRPSL_MEDIA(R3),R0            ; Get address of temporary buffer
              BSBW      UDA_DEANONPAGED               ; De-allocate system buffer
45$:          BISW2     #UDASW_PQUED,UDASW_FLAGS(R1)  ; Set a packet was queued flag
              INCL      UCBSL_OPCNT(R5)               ; Account for queued I/O in Clone UCB
50$:          REMQUE    @(R4),R3                      ; Remove IRP from input queue
              BEQL      55$                           ; None left, prepare to leave
              BRW       5$                            ; Process next IRP
55$:          POPR      #^M<R6,R7,R8>                 ; Restore registers
              DSBINT                                  ; Disable all interupts
              BBSS      #UDASV_CLINKED,-              ; Link clone in with UCB list if
                        UDASW_FLAGS(R1),56$           ; this is the first I/O
              BSB       LINK_CLONE
56$:          BBSC      #UDASV_PQUED,-                ; Alert UDA of queued MSCP packets
                        UDASW_FLAGS(R1),60$           ; if que flag is set
              TSTL      UCBSL_OPCNT(R5)               ; Are there any unfinished I/O's ?
              BNEQ      62$                           ; Yes, allow for possible UDA timeout
              BRW       UDA_HOST_TIMER                ; Set host timer and return to caller
60$:          MOVL      UDASL_UCB_ZERO(R1),R4         ; Get address of Host Timer UCB
              BICW2     #UCBSW_TIM,UCBSW_STS(R4)      ; Clear timeout bit
              MOVL      UCBSL_CRB(R5),R4              ; Get address of UDAIP I/O page
              MOVL      CRBSL_INTD+VECSL_IDB(R4),R4   ; register avoiding indirect
              MOVL      (R4),R4                       ; references
              TSTW      UDAIP(R4)                     ; Initiate UDA Polling
              BBC       #VASV_SYSTEM,-                ; Take KSS exit if Clone is already
                        UCBSL_FPC(R5),65$             ; in the fork queue.
62$:          ENBINT                                  ; Reset IPL to fork level
              RSB                                     ; Return to caller 65$:          BISW2     #UDASW_INTEXPCT,UDASW_FLAGS(R1) ; Set interupt expected
              $FIRKCH   UDA_TIMEOUT,#10
              IOFORK                                  ; Create a fork process UDA_FORK_PROC:                                        ; Reference label for unsolicited interupts MOVL      R4,R1                         ; Copy address of internal buffers
              CLRL      UCBSL_FPC(P5)                 ; Clear fork dispatch address in UCB
              PUSHR     #^M<R6,R7,R8>                 ; Save registers
              BSBB      UDA_FINISHIO                  ; Close out end packets
              BRW       5$                            ; Try to queue new packets before exit .SBTTL    UDA_FINISHIO - Close out I/O routine
              .PAGE
;++
; UDA_FINISHIO - UDA driver I/O closeout routine
;-

; Inputs:
;         R1 = Address of internal data structures
;         R3 = Address of IDB
;         R5 = Address of Clone UCB
; Register assignments:
;         R0 = Address of End packet being processed
;         R2 = Address of associated Command Packet List Entry
;         R3 = Address of associated IRP
;         R7 = Scratch and I/O Status argument register
;         R8 = Scratch and I/O sub status argument register
;--

UDA_FINISHIO:
              BSBW      GET_END_PACKET                ; Get next end packet
              TSTL      R0                            ; Did we get one ?
              BNEQ      105$                          ; Yes
              RSB                                     ; Return to caller
105$:         BBS       #VASV_SYSTEM,-
                        MSCPSL_CMD_REF(R0),109$       ; Process IRP
              BLBC      UDASW_FLAGS(R1),108$          ; Skip internal pkt if UDA is offline
              BSBW      UDA_PROC_INTRNL               ; Process internal packet
```

```
108$:   DECL    UCBSL_OPCNT(R5)             ; Account for I/O in Clone UCB
        BSRW    UDA_RESET_RINGS             ; Reset rings to proper own state
        BRB     UDA_FINISHIO                ; Go again
109$:   MOVL    MSCPSL_CMD_REF(R0),R3       ; Get address of IPP
        TSTL    CPKES4_MAPREG(R2)           ; Were UBA resources acquired ?
        BEQL    110$                        ; No
        PUSHR   #^M<R0,R1,R2,R3>            ; Save current context
        MOVL    UCBSL_CRB(R5),R3            ; Get address of CRB
        MOVL    CPKESW_MAPREG(R2),-         ; Load UBA mapping context into CRB
                CRBSL_INTD+VECS#_MAPREG(R3)
        JSB     G^IOCSPURGDATAP             ; Purge buffered data path
        JSB     G^IOCSRELDATAP              ; Release Buffered Data Path
        JSB     G^IOCSRELMAPREG             ; Release UBA Mapping Registers
        CLRL    R6                          ; Clear index
115$:   MOVL    MSCPSL_CMD_REF(R0)[R6],(R8)[R6] ; Copy end packet into
        AOBLSS  #MSCPSK_PKTSIZE*4-3,R6,115$ ; diagnostic buffer for user
        MOVL    CPKESL_USERREF(R2),(R8)     ; Restore user's reference number
120$:   INSV    MSCPSW_STATUS(R0),-         ; Load End Pkt Status for IOSB word 1
                #16,#16,R7
        CMPZV   #MSCPSV_ST_MASK,-           ; Was the I/O successful ?
                #MSCPSS_ST_MASK,MSCPSW_STATUS(R0),#MSCPSK_ST_SUCC
        BNEQ    130$                        ; No
        MOVW    #SSS_NORMAL,R7              ; Load Success Status for IOSB word 0
        MOVL    MSCPSL_BYTE_CNT(R0),R8      ; Load Byte Count Field for IOSB LW 1
125$:   BSRW    UDA_IOPOST                  ; Close out the I/O
        BSRW    UDA_RESET_RINGS             ; Reset control flags in rings
        BRW     UDA_FINISHIO                ; Process next end packet
130$:   MOVW    #SSS_DEVREQERR,R7           ; Set failure Status
        CMPZV   #MSCPSV_ST_MASK,-           ; Did the unit go offline ?
                #MSCPSS_ST_MASK,-
                MSCPSW_STATUS(R0),#MSCPSK_ST_OFFLN
        BNEQ    125$                        ; No, return device request error stat
        MOVW    #SSS_DEVOFFLINE,R7          ; Load device offline status
        TSTW    MSCPSW_UNIT(R0)             ; Is this Unit 0
        BEQL    125$                        ; Yes, leave it alone
        MOVL    IRPSL_UCB(R3),R6            ; Get address of UCB
        BICW2   #UCBSM_ONLINE,-             ; Clear Online Flag in UCB and close
                UCBSW_STS(R6)               ; out the I/O
        BRB     125$

.DISABLE LSB

UDA_PROC_INTRNL:                            ; Process internal packet

; Inputs:
;       R0 = Address of End packet being processed
;       R1 = Address of internal data structures
;       R2 = Address of associated Command Packet List Entry MOVZBL  MSCPSB_OPCODE(R0),R7        ; Get MSCP packet end code
        CMPB    R7,#<MSCPSK_OP_ONLIN!MSCPSK_OP_END> ; Is it an ONLINE end code
        BEQL    5$                          ; Yes
        CMPB    R7,#<MSCPSK_OP_GTUNT!MSCPSK_OP_END> ; Is it a get unit status?
        BNEQ    35$                         ; No, ignor it then ; Get address of UCB corresponding to Unit Number in MSCP End packet 5$:     MOVL    UDASL_UCB_ZERO(R1),R3       ; Get address of UCB 0
10$:    CMPW    UCBSW_UNIT(R3),MSCPSW_UNIT(R0) ; Are unit numbers the same
        BEQL    15$                         ; Yes
        MOVL    UCBSL_LINK(R3),R3           ; get address of next UCB
        BNEQ    10$                         ; Try this one, 0 = last UCB
        RSB                                 ; Not a normal unit number, ignor it 15$:    CMPB    R7,#<MSCPSK_OP_GTUNT!MSCPSK_OP_END> ; Is it a get unit status?
        BEQL    30$                         ; Yes, process it down stairs
        MOVZWL  MSCPSW_UNIT(R0),R7          ; Get unit number
        BEQL    20$                         ; It's Unit zero, do not mark offline ; Set other than unit zero off-line until receipt of a success GET UNIT STATUS
; end packet BICW2   #UCBSM_ONLINE,UCBSW_STS(R3)
20$:    BICW2   #^C<MSCPSM_ST_MASK>,-       ; Is return status success ?
                MSCPSW_STATUS(R0)
        BNEQ    35$                         ; No
        MOVL    MSCPSL_UNT_SIZE(R0),-       ; Load max LBN value for system use
                UCBSL_MAXBLOCK(R3)          ; into UCB
        PUSHR   #^M<R0,R1,R2>               ; Save context
        BSBW    UDA_GET_INTPKT              ; Make a get unit status command pkt
        BLBC    R0,25$                      ; Allocation failure
        MOVW    R7,MSCPSW_UNIT(R2)          ; Load unit number in packet
        MOVB    #MSCPSK_OP_GTUNT,MSCPSB_OPCODE(R2) ; Load get unit status
        MOVL    UDASL_INTPQUF(R1),R1        ; Get internal pkt queue listhead
        ADDL2   S^#4,R1                     ; Address the back link
        INSQUE  (R2),@(R1)                  ; Insert in rear of queue
25$:    POPR    #^M<R0,R1,R2>               ; Restore original context
        RSB                                 ; exit ; Process the GET UNIT STATUS MSCP End packet 30$:    BICW2   #^C<MSCPSM_ST_MASK>,-       ; Is return status success ?
                MSCPSW_STATUS(R0)
        BNEQ    35$                         ; No
        BISW2   #UCBSM_ONLINE,UCBSW_STS(R3) ; Set unit's UCB status to online
```

```
; NOTE: The current disk geometry of sectors/tracks/cylinders is equal to
;       the MSCP track/group/cylinder definitions. Future devices though
;       may go to the four dimensional hyper-cube architecture defined
;       in the Disk MSCP spec, which will invalidate the following code.

MOVW    MSCPSW_CYLINDER(R0),-           ; Load Cylinders value in UCB
                 UCBSW_CYLINDERS(R3)
         MOVB    MSCPSW_GROUP(R0),-              ; Load tracks value in UCB
                 UCBSB_TRACKS(R3)
         MOVB    MSCPSW_TRACK(R0),-              ; Load sectors value in UCB
                 UCBSB_SECTORS(R3)
35$:     RSB                                     ; Return CHECK_ABORT:                                     ; routine added 5/15/81 to handle reference numbers for
                                                 ; abort and get command status test.    hrs CMPB    MSCPSB_OPCODE(R0),-             ; Is this an ABORT command
                 #MSCPSK_OP_ABORT
         BEQL    5$                              ; Yes
         CMPB    MSCPSB_OPCODE(R0),-             ; Is this a get cmd status
                 #MSCPSK_OP_GTCMD
         BNEQ    20$                             ; No, return
5$:      MOVL    UDASL_CMD_LIST(R1),R7           ; Get address of command list
         CLRL    R8                              ; Clear loop counter
10$:     PBC     #VASV_SYSTEM,(R7),15$           ; Internal packet or none at all
         CMPL    CPKESL_USERREF(R7),-            ; Are MSCP reference numbers equal
                 MSCPSL_OUT_REF(R0)
         BNEQ    15$                             ; No
         MOVL    (R7),MSCPSL_OUT_REF(R0)         ; Load internally assigned ref num
         RSB                                     ; Return
                 20$
15$:     ADDL2   S^#CPKESK_SIZE,R7               ; Point to next cmd list entry
         AOBLSS  #12,R8,10$                      ; Loop through list
20$:     RSB .SBTTL  UDA_HOST_TIMER - HOST to UDA Timeout Handler
         .PAGE
;++
; UDA_HOST_TIMER - HOST to UDA Timeout handler
;

; Inputs:
;       R1 = Address of Internal Data Structures
;
;--

UDA_HOST_TIMER:
         MOVL    R1,R4                           ; Save address of internals
         MOVL    UDASL_UCB_ZERO(R1),R5           ; Get address of UCB 0 for host timer
         WFIKPCH 10$,#30                         ; Use IUCSWFIKPCH for eventual timeout
10$:     BLBC    UDASW_FLAGS(R4),20$             ; Exit if UDA is flagged offline
         MOVL    UDASL_CLONEUCB(R4),R4           ; Get address of Clone UCB
         TSTL    UCBSL_OPCNT(R4)                 ; Is STARTIO queueing packets ?
         BNEQ    20$                             ; Yes, leave
         JSB     G^EXESIOFORK                    ; Make a I/O fork for syncronization
         BSBW    UDA_GET_INTPKT                  ; Get an internal packet
         BLBC    R0,20$                          ; None around, too bad
         MOVB    #MSCPSK_OP_FLUSH,-              ; Make a No-Op (FLUSH) UDA command
                 MSCPSB_OPCODE(R2)
         MOVL    S^#4,MSCPSL_BYTE_CNT(R2)        ; Unit 0
                                                 ; Load a bogus byte count
         MOVL    R5,-(SP)                        ; Save current UCB address
         BSBW    LOAD_INIP_PKT                   ; Load an que packet to UDA
         MOVL    (SP)+,R5                        ; Restore input UCB
20$:     RSB                                     ; Return to fork dispatcher .SBTTL  UDA_TIMEOUT - UDA timeout handler
         .PAGE
;++
; UDA_TIMEOUT - UDA Command Timeout Handler
;

; Inputs:
;       R4 = Address of UDAIP
;       R5 = Address of Clone UCB
;
;--

UDA_TIMEOUT:
         CLRW    UDAIP(R4)                       ; Reset the UDA
         MOVAB   UDASL_INTERNAL,R1               ; Get address of internals
         BISW2   #UDASM_TIMEOUT,UDASW_FLAGS(R1)  ; Set timeout flag
         BICW2   #<UDASM_ONLINE!UDASM_INTFXPCT>,- ; Reset interupt expected
                 UDASW_FLAGS(R1)                 ; and UDA Online flags
         MOVL    UDASL_UCB_ZERO(R1),R0           ; Get address of HOST timeout UCB
         BICW2   #^C<UCBSM_ONLINE>,-             ; Clear all status bits in UCB 0
                 UCBSW_STS(R0)                   ; with the exception of ON LINE
         JSB     G^EXESFORK                      ; Synch driver at fork IPL
         CLRW    UCBSW_STS(R5)                   ; Clear all status bits in Clone UCB
         MOVAB   UDASL_INTERNAL,R1               ; Get address of internals
         PUSHR   #^M<R6,R7,R8>                   ; Save work registers
         BSBW    UDA_FINISHIO                    ; Close out end packets if any ; Flush Internal Packet Queue MOVL    UDASL_INTPQUE(R1),R2            ; Get address of internal packet que
4$:      REMQUE  @(R2),R0                        ; Get next internal wait packet
         BVS     5$                              ; Queue is empty
         BSBW    UDA_DEANONPAGED                 ; Return buffer to system
```

```
           BKP     4S                          ; Loop until queue is empty
 5$:       CLRL    R2                          ; Initialize loop counter
           MOVZWL  #SS$_TIMEOUT,R7             ; Load primary I/O error status ; Rundown all I/O's that were already queued to the UDA but were never
; terminated via an End Packet (i.e., those MSCP Packets in the active
; list not closed out by the FINISHIO routine). Internal packets are ignored.

MOVL    UDA$L_CMD_LIST(R1),R4       ; Get address of active cmd list
 10$:      BBC     #VA$V_SYSTEM,-              ; Skip empty or internal packets
                   CPKE$L_CMD_REF(R4),15$      ; Cancel only unfinished IRPs
           MOVL    CPKE$W_MAPREG(R4),R0        ; Were UBA resources acquired ?
           BEQL    11$                         ; No
           PUSHR   #^M<R2,R4>                  ; Save current context
           MOVL    UCB$L_CRB(R5),R3            ; Get address of CRB
           MOVL    R0,CRB$L_INTD+VEC$W_MAPREG(R3) ; Load mapping context in CRB
           JSB     G^IOC$PURGDATAP             ; Purge buffered data path
           JSB     G^IOC$RELDATAP              ; Release Buffered Data Path
           JSB     G^IOC$RELMAPREG             ; Release UBA Mapping Registers
           POPR    #^M<R2,R4>                  ; Restore previous context
 11$:      MOVL    CPKE$L_CMD_REF(R4),R3       ; Get address of IRP
           MOVL    R4,R0                       ; Copy MSCP packet address for IOCAN
           SUBL2   S^#4,R0                     ; Equate MSCP pkt offsets to cmd list
           BSBB    UDA_IOCAN                   ; Close out the IRP
 15$:      ADDL2   S^#CPKF$K_SIZE,R4           ; Get address of next packet
           AOBLSS  #CPKF$K_LIST_LEN,R2,10$     ; Check all command packets ; Rundown all IRPs that are still in the UCB IRP list. These were never
; initiated at all.

MOVAB   UCB$L_IOQFL(R5),R2          ; Get address of input IRP queue
 20$:      REMQUE  @(R2),R3                    ; Remove next IRP from queue
           BVS     30$                         ; Queue is empty
           MOVL    IRP$L_MEDIA(R3),R0          ; Get backup packet if any
           BSBB    UDA_IOCAN                   ; Cancel the I/O
           BBC     #VA$V_SYSTEM,R0,20$         ; Close out next IRP
           BSBW    UDA_DEANONPAGED             ; Return buffer to system
           BRB     20$                         ; Continue for all outstanding IRPs
 30$:      CLRL    UCB$L_OPCNT(R5)             ; Clear I/O count field in Clone UCB
           POPR    #^M<R6,R7,R8>               ; Restore work registers
           RSB .PAGE
;++
; UDA_IOCAN - I/O canceller routine called by the Timeout Handler for
;             internal I/O rundown of IRPs and MSCP End packets.
;
; Inputs:
;       R0 = Address of unfinished MSCP Packet
;       R3 = Address of IRP
;       R7 = SS$_TIMEOUT status
;--

UDA_IOCAN:
           BBC     #IRP$V_DIAGBUF,-            ; Skip next if this was not a direct
                   IRP$W_STS(R3),10$           ;  MSCP packet I/O
           BISB2   #MSCP$V_OP_END,-            ; Set end code flag in packet
                   MSCP$B_OPCODE(R0)
           MOVW    #MSCP$K_ST_CNTRL,-          ; Set controller error return status
                   MSCP$W_STATUS(R0)
           MOVL    @IRP$L_DIAGBUF(R3),R8       ; Get address of buffer's data area
           CLRL    R6                          ; Clear index
 5$:       MOVB    MSCP$L_CMD_REF(R0)[R6],(R8)[R6] ; Copy end packet into
                                               ;  return buffer for user
           AOBLSS  #MSCP$K_PKTSIZE@-3,R6,5$
           BRB     15$                         ; Close out the I/O
 10$:      CLRL    R0                          ; Set no system buffer flag
 15$:      CLRL    R8                          ; Clear secondary IOSB long word value
           BRW     UDA_IOPOST                  ; Close out the IRP and return to caller .SBTTL  UDA_INITIALIZE - UDA Initialization
           .PAGE
;++
; UDA_INITIALIZE - Primary Level UDA Initialization Routine
;
; Functional Description:
; /IRS/
; IPL Level = Powerfail IPL
; Inputs:
;       R4 = Address of the CSR (UDAIP)
;       R5 = Address of IDB (Interrupt Data Block)
;       R6 = Address of DDB (Device Data Block)
;       R8 = Address of CRB (Channel Request Block)
;
; Internal registers:
;       R5 = address of a UCB
;       R7 = Address of internal data structures
;       R9 = saved address of the IDB
;--

UDA_INITIALIZE:
           JSB     G^INI$BRK                   ; Save registers
           PUSHR   #^M<R5,R7,R9>               ; Get address of internal structures
           MOVAB   UDA$L_INTERNAL,R7           ; Clear timeout and
           BIC#2   #<UDA$M_ONLINE!UDA$M_TIMEOUT>,- ; Controller on line flags
                   UDA$W_FLAGS(R7)
```

```
        RBC     #UDASV_BUFALOC,-            ; Acquire system pool if not already
                UDASW_FLAGS(R7),5$          ; allocated and mapped to the UBA
        BRW     15$                         ; Begin UDA initialization
5$:     MOVZB#  S^#1,UDASW_INIT_ERR(R7)     ; Load buffer alloc failure flag
        MOVZWL  #IBUFSK_SIZE,R1             ; Load buffer size
        BSB#    UDA_ALONONPAGED             ; Get a system buffer
        BLBS    R0,10$
        BRW     35$                         ; Allocation failure
10$:    BIS#2   #UDASM_BUFALOC,-            ; Flag buffer allocated
                UDASW_FLAGS(R7)
        MOVAB   INTPSL_FLINK(R2),-          ; Save address of internal MSCP
                UDASL_INTPQUE(R7)           ; packet queue listhead
        MOVAB   ACTSL_CMD_LIST(R2),-        ; Save address of Active MSCP
                UDASL_CMD_LIST(R7)          ; Command packet List
        MOVL    R5,R9                       ; Save address of ILP
        MOVL    IDBSL_UCBLST(R5),-          ; Save address of UCB 0
                UDASL_UCB_ZERO(R7)
        MOVAB   UCBS_CLONE(R2),R5           ; Load clone UCB address in R5
        MOVL    R5,IDBSL_OWNER(R9)          ; Set clone to owner UCB in IDB
        MOVL    R5,UDASL_CLONEUCB(R7)       ; Save address in local data structure
        MOVW    #UCBSK_SIZE,UCBSW_SIZE(R5)  ; Create a bare bones UCB
        MOVB    #DYJSC_UCB,UCBSB_TYPE(R5)   ; Load data structure size and type
        MOVB    S^#FORK_IPL,UCBSB_FIPL(R5)  ; Load fork IPL
        MOVL    R8,UCBSL_CRB(R5)            ; Load address of CRB
        MOVL    R6,UCBSL_DDB(R5)            ; Load address of DDB
        MOVAB   UCBSL_IOQFL(R5),UCBSL_IOQFL(R5) ; Initialize IO queue listhead
        MOVAB   UCBSL_IOQFL(R5),UCBSL_IOQBL(R5)
        MOVW    S^#9,UCBSW_UNIT(R5)         ; Set unit number to 9
        MOVB    S^#DEVICE_IPL,UCBSB_DIPL(R5) ; Load device IPL
        CLRL    UCBSL_OPCNT(R5)             ; Clear I/O count field
        MOVW    R1,UCBSW_BCNT(R5)           ; Load byte count
        BIC#3   #^C<VASM_BYTE>,R2,-         ; Load byte offset from page
                UCBSW_BOFF(R5)
        MOVW    UCBSW_BOFF(R5),UDASW_BOFF(R7) ; Save for driver
        MOVL    R2,UDASL_BUFTOP(R7)         ; Save buffer address for internal use ; Eliminate Clone UCB and Active MSCP Packet List from mapping SUB#2   #<<UCBSK_CLN_SIZE>+<CPKESK_SIZE*CPKESK_LIST_LEN>>,-
                UCBSW_BCNT(R5)
        JSB     G^MMGSSVAPTECHK             ; Get SVAPTE for buffer's virtual addr
        MOVL    R3,UCBSL_SVAPTE(R5)         ; Load buffer system virtual address
        INC#    UDASW_INIT_ERR(R7)          ; Set mapping failure flag
        JSB     G^IOCSALOUBAMAP             ; Allocate UBA mapping registers
        BLBC    R0,40$                      ; Allocation Failure
        BIS#2   #UDASM_BUFMAPD,-            ; Flag buffer mapped
                UDASW_FLAGS(R7)
        MOVL    CRBSL_INTD+VECSW_MAPREG(R8),-
                UDASW_MAPREG(R7)            ; Save UBA mapping context
        JSB     G^IOCSLOADUBAMAP            ; Load UBA mapping registers for UBA
15$:    MOVL    UDASL_CLONEUCB(R7),R5       ; Get address of clone UCB
        MOVAB   CONTINUE_INIT,UCBSL_FPC(R5) ; Init fork PC address in UCB
        MOVZB#  S^#3,UDASW_INIT_ERR(R7)     ; Set step 1 failure flag
        CLRW    UDAIP(R1)                   ; Begin UDA initialization sequence
        CLRL    R1                          ; Clear index register
25$:    MOVZWL  UDASA(R4),R0                ; Read UDASA
        MOVW    R0,UDASW_STEP_ERR(R7)       ; Load step word in error buffer
        BBS     #INIT_V_ERROR,R0,35$        ; Step 1 error, end init sequence
        BBS     #INIT_V_STEP1,P0,30$        ; Step one completion flag set
        AOBLSS  #LOOP_LIMIT,R1,25$          ; Loop
        BRB     35$                         ; Step one completion error
30$:    INC#    UDASW_INIT_ERR(R7)          ; Set potential interrupt failure
        BIS#2   #<UDASM_S2EXPCT!UDASM_INTEXPCT>,-
                UDASW_FLAGS(R7)             ; Set step two interupt expected
        MOVW    #STEP_1_WRITE,UDASA(R4)     ; Write step one word to UDA
35$:    POPR    #^M<R5,R7,R9>               ; Restore registers
        RSB
40$:    POPR    #^M<R5,R7,R9>               ; Restore registers
        BRW     UDA_UNLOAD                  ; Release resources and return .SBTTL  CONTINUE_INIT - UDA Controller Initialization Continuation
        .PAGE
;++
; CONTINUE_INIT - Controller initialization sequence continuation
;
; Functional Description
;       /TBS/
; IPL Level = Fork IPL
; Inputs:
;       R3 = Pointer to UDA registers
;       R4 = Address of internal data structures
;       R5 = Address of clone UCB
;--
        .ENABLE LSB CONTINUE_INIT:
        JSB     G^EXESFORK                  ; Create a fork process
        MOVAB   CONTINUE_INIT,UCBSL_FPC(R5) ; Load interupt continuation adur
        MOVL    (R3),R3                     ; Get UDAIP address
        MOVL    R4,R1                       ; Copy internals buffer address
        INC#    UDASW_INIT_ERR(R1)          ; Flag possible step response error ; Process controller step initialization MOVZWL  UDASA(R3),R2                ; Get step word from UDA
        MOVW    R2,UDASW_STEP_ERR(R1)       ; Load step response for possible err
```

```
            BBSC    #UDASV_S4EXPCT,-                ; Process expected step 4
                    UDASW_FLAGS(R1),30S
            BBSC    #UDASV_S3EXPCT,-                ; Process expected step 3
                    UDASW_FLAGS(R1),5S
            BICW2   #UDASW_S2EXPCT,UDASW_FLAGS(R1)  ; Clear step 2 expected flag
            CMPW    #STEP_2_READ,R2                 ; Is the response correct ?
            BNEQ    10S                             ; No terminate
            MOVZWL  UDASW_BUFF(R1),R0               ; Load byte offset
            INSV    UDASW_MAPREG(R1),#9,-           ; Set mapping register bits 0 - 6
                    #9,R0
            ADDL2   #RESRSL_TOP,R0                  ; Set address to top of rings
            MOVL    R0,@(R1)                        ; Save address for step 3
            BISW2   #INIT_M_PURGE,R0                ; Set purge enable flag
            BISW2   #<UDASM_S3EXPCT!UDASM_INTEXPCT>,- ; Set step 3 and interrupt
                    UDASW_FLAGS(R1)                 ; expected
            MOVW    R0,UDASA(R3)                    ; Write step word 2
            BRB     20S                             ; Return to fork dispatcher
5S:         CMPW    #STEP_3_READ,R2                 ; Is the step 3 response correct ?
            BEQL    15S                             ; Yes
10S:        CLPW    UDAIP(R3)                       ; Reset UDA on detected error
            RSB                                     ; Return to fork dispatcher
15S:        BISW2   #<UDASM_S4EXPCT!UDASM_INTEXPCT>,- ; Set step 4 and interrupt
                    UDASW_FLAGS(R1)                 ; expected
            EXTZV   #16,#2,4(R1),R0                 ; Write step 3 word
            MOVW    R0,UDASA(R3)
20S:        INCW    UDASW_INIT_ERR(R1)              ; Flag possible interrupt failures
            RSB
30S:        BBS     #INIT_V_ERROR,R2,10S            ; Terminate init seq on fatal error
            BBC     #INIT_V_STEP4,R2,10S            ; Terminate if step sequence error
            BISW2   #5,UDASA(R3)                    ; Set GO and quad word burst
;           BISW2   #INIT_M_GO,UDASA(R3)            ; Write Go flag to UDA
            CLRL    UCBSL_FPC(P5)                   ; Clear fork pc in clone UCB
            CLRL    UDASW_INIT_ERR(R1)              ; Clear init error flags ; Map data base for UDA/Driver and initialize queue listheads MOVZWL  UDASW_BUFF(R1),R3               ; Develop UBA address base for UDA
            INSV    UDASW_MAPREG(R1),#9,#9,R3
            ADDL2   #<RESPSL_TOP+MSCPSK_PKT_HDR>,R3
            MOVL    UDASL_BUFTOP(R1),R0             ; Get address to top of system buffer
            MOVL    R0,R2                           ; Copy
            MOVL    R2,R1                           ; Again
            ADDL2   #RESPSL_TOP,R1                  ; Create addr to top of RES packets
            MOVAL   RESQSL_FLINK(R2),(R0)+          ; Initialize Response queue listhead
            MOVAL   RESQSL_FLINK(R2),(R0)+
            TSTL    (R0)+                           ; Skip buffer descriptor
            MOVAL   CMDQSL_FLINK(R2),(R0)+          ; Initialze Command queue listhead
            MOVAL   CMDQSL_FLINK(R2),(R0)+
            MOVAL   INTPSL_FLINK(R2),(R0)+          ; Initialize internal packet wait
            MOVAL   INTPSL_FLINK(R2),(R0)+          ; queue listhead
            CLRQ    (R0)+                           ; Clear purge and interrupt words
            MOVL    #RESPSL_TOP,P4                  ; Init index from top of response pkts
            CLRL    R5                              ; Clear loop index
35S:        MOVL    R3,(R0)                         ; Link packet to message ring entry
            MOVZBL  S^#4B,CPKESW_PKT_LEN(R1)        ; Load Pkt Len and clr Vir Cir ID
            MOVL    R0,CPKESL_RINGP(R1)
            BISL2   #<UDA_M_OWN!UDA_M_FLAG>,(R0)+   ; Set entry to UDA Own
            INSQUE  CPKESL_PQFL(R2)[R4],-           ; Insert packet in back of response que
                    @RESQSL_BLINK(R2)
            ADDL2   #RESPSL_SIZE,R3                 ; Develop UBA address of next RES pkt
            ADDL2   #RESPSK_SIZE,R4                 ; Bump index register to next RES pkt
            ADDL2   #RESPSK_SIZE,R1
            AOBLSS  #MSCPSK_RINGSIZE,R5,35S         ; Loop thru all RES ring/pkt entries
40S:        MOVL    R0,CPKESL_RINGP(R1)
            MOVZBL  S^#8,CPKESW_PKT_LEN(R1)         ; Load Pkt Len and clr Vir Cir ID
            MOVL    R3,(R0)+                        ; Link packet to command ring entry
            INSQUE  CPKESL_PQFL(R2)[R4],-           ; Insert packet in back of command que
                    @CMDQSL_BLINK(R2)
            ADDL2   #CMDPSK_SIZE,R3                 ; Develop UBA address to next cmd pkt
            ADDL2   #CMDPSK_SIZE,R4                 ; Bump index register to next cmd pkt
            ADDL2   #CMDPSK_SIZE,R1
            SOBGTR  R5,40S                          ; Loop thru all cmd ring/pkt entries ; Clear Command Reference Number and UBA Resource Values Field in each
; entry of the Active MSCP Command packet List ADDL2   #ACTSL_CMD_LIST,R2              ; Point to top of command list
45S:        CLRQ    (R2)
            ADDL2   #CPKFSK_SIZE,R2                 ; Point to next entry
            AOBLSS  #CPKFSK_LIST_LEN,R5,45S         ; Loop through list ; Send UDA eight online packets for units 0 thru 7

MOVAB   UDASL_INTERNAL,R1               ; Reload addr of internal structures
            MOVL    UDASL_INTPQUE(R1),R3            ; Get address of internal pkt listhead
            ADDL2   S^#4,R3                         ; Get backlink address
            CLRL    R4                              ; Clear R4
50S:        BSBW    UDA_GET_INTPKT                  ; Get an internal MSCP packet buffer
            BLBC    R0,55S                          ; Allocation failure
            MOVB    #MSCPSK_OP_ONLIN,-              ; Load online command in MSCP packet
                    MSCPSW_OPCODE(R2)
            MOVW    R4,MSCPSW_UNIT(R2)              ; Load unit number
            MOVW    R4,MSCPSW_SHDW_UNIT(R2)         ; Load shadow unit number
            INSQUE  (R2),@(R3)                      ; Insert packet in rear end of queue
            AOBLSS  #8,R4,50S                       ; Loop for 8 online packets
```

; Send UDA the Set Controller Characteristics Command Packet to enable
; Attention Messages and a 60 second host timeout value.

```
            BSBW    UDA_GET_INTPKT                  ; Get an internal MSCP packet buffer
            BLBC    R0,55$                          ; Allocation failure
            MOVB    #MSCPSK_OP_STCON,-              ; Load Set Controller Characteristics
                    MSCPSB_OPCODE(R2)               ; op code
            BISW2   #MSCPSM_CF_AVATN,MSCPSW_CNT_FLGS(R2)  ; Set controller flags
            MOVW    #60,MSCPSW_HST_TMO(R2)          ; Set host timeout to 60 seconds
            BISW2   #UDASM_ONLINE,UDASW_FLAGS(R1)   ; Set controller on line flag LOAD_INTP_PKT:      ; Reference label for internal packet loading MOVL    UDASL_INTPQUE(R1),R3            ; Get address of internal pkt listhead
            ADDL2   S^#4,R3                         ; Get backlink address
            INSQUE  (R2),@(R3)                      ; Insert packet in rear end of queue
            BRW     UDA_INTERNAL_IO                 ; Que packet to UDA
55$:        RSB                                     ; Error return .DISABLE LSB
            .SBTTL  UDA Interupt Service Routine
            .PAGE
;++
; UDA_INTERUPT -   Interupt Service Routine
;
; Functional Description:
; /TBS/
;
; Inputs:
;       0(SP) = Pointer to IDB
;       R5 = Address of Clone UCB
;       R0 - R4 = Scratch
; Outputs for routine called:
;       R3 = Pointer to UDAIP
;       R4 = Address of Internal Data Structures
;       R5 = Address of Clone UCB
;--

UDA_INTERUPT::
            MOVL    @(SP)+,R3                       ; Get address of IDB
            MOVAB   UDASL_INTERNAL,R4               ; Get address of internal structures
            BBS     #UDASV_TIMEOUT,-                ; Ignor interupt if timeout is set.UDA
                    UDASW_FLAGS(R4),20$             ; is incoherent at this point anyway
            MOVL    IDBSL_OWNER(R3),R5              ; Load owner UCB for EXESFORK
            BBC     #UDASV_ONLINE,-                 ; Skip purge check if UDA is offline
                    UDASW_FLAGS(R4),10$
            MOVL    UDASL_BUFTOP(R4),R2             ; Get address of system buffer
            TSTB    CMDSB_PURGF(R2)                 ; Is a data path purge requested ?
            BEQL    10$                             ; No, test for normal interupt
            MOVL    UCBSL_CRB(R5),R1                ; Get address of CRB
            MOVB    CRBSL_INTD+VECSB_DATAPATH(R1),-(SP) ; Save current DP in CRB
            MOVB    CMDSB_PURGF(R2),-               ; Load data path number to be purged
                    CRBSL_INTD+VECSB_DATAPATH(R1)   ; into CRB
            PUSHR   #^M<R1,R2,R3>                   ; Save registers from sys routine
            JSB     G^IOCSPURGDATAP                 ; Purge the data path
            POPR    #^M<R1,R2,R3>                   ; Restore previous context
            MOVB    (SP)+,CRBSL_INTD+VECSB_DATAPATH(R1) ; Restore previous DP
            CLRB    CMDSB_PURGF(R2)                 ; Clear Data Path in interupt word
            MOVL    (R3),R2                         ; Get address of UDAIP
            CLRW    UDASA(R2)                       ; Let UDA know we're done
10$:        BBCC    #UDASV_INTEXPCT,-               ; Dispatch interupt if expected
                    UDASW_FLAGS(R4),15$             ; or process possible attention pkt
            JSB     @UCBSL_FPC(R5)                  ; Go to appropriate routines
            BRB     20$                             ; Restore registers and ret from int
15$:        BLBC    UDASW_FLAGS(R4),20$             ; Ignor unsolicited interupt if the
                                                    ; UDA is off line
            BBS     #VASV_SYSTEM,-                  ; If clone isn't already in fork queue
                    UCBSI_FPC(R5),20$               ; put it there to get message packet
            PUSHR   3U$                             ; Create a fork process
20$:        MOVQ    (SP)+,R0
            MOVQ    (SP)+,R2
            MOVQ    (SP)+,R4
            REI 30$:        JSB     G^EXESFORK                      ; Gracefully go to fork IPL
            BRW     UDA_FORK_PROC                   ; Use the standard fork processor
                                                    ; for unsolicited Attention Messages .SBTTL  UDA_UNLOAD - UDA driver unload routine
            .PAGE
;++
; UDA_UNLOAD - driver unload routine.
;
; Functional Description:
; /TBS/
;
; Inputs: Unknown if here from SYS$SYSGEN
;--

UDA_UNLOAD:
            PUSHR   #^M<R1,R2,R3,R4,R5,R6>          ; Save registers
            MOVAB   UDASL_INTERNAL,R6               ; Get address of internal structures
            BBC     #UDASV_BUFALOC,-                ; Exit if no system buffer allocated
                    UDASW_FLAGS(R6),15$
            BBC     #UDASV_CLINKED,-                ; Skip clone unlinking if never linked
                    UDASW_FLAGS(R6),5$
```

```
             MOVL      UDASL_CLONEUCB(R6),R5    ; get address of Clone UCB
             MOVL      UCBSL_DEVDEPEND(R5),R5   ; Get address of back linked UCB
             CLRL      UCBSL_LINK(R5)           ; Set this UCB to last
5S:          RBC       #UDASV_BUFMAPD,-         ; Exit if buffer not mapped to UBA
                       UDASW_FLAGS(R6),10S
             MOVL      UDASL_CLONEUCB(R6),R5    ; get address of Clone UCB
             MOVL      UCBSL_CRB(R5),R4         ; Get address of CRB
             MOVL      UDASW_MAPREG(R6),-       ; Load UBA context in CRB
                       CRBSL_INTD+VECSA_MAPREG(R4)
             JSB       G^IOCSRELMAPREG          ; Release mapping registers
10S:         MOVL      UDASL_BUFTOP(R6),R0      ; Get address of system buffer
             BSBW      UDA_DEANONPAGED          ; Deallocate system buffer
15S:         MOVL      S^#SSS_NORMAL,P0         ; Set normal for caller if Reloading
             CLRW      UDASW_FLAGS(R6)          ; Reset all flags for internal init
             POPR      #^M<R1,R2,R3,R4,R5,R6>   ; Restore registers
             RSB                                ; Return to caller
             .SBTTL    Driver Support Routines
             .PAGE
;++
; UDA_RESET_RINGS - Routine to set the Response ring's own flag to UDA own,
;                   and clear the first quadword in the active command list
;                   entry pointed to by R2.
;
; Inputs:
;       R0 = Address of response packet
;       R2 = Address of command packet list entry
;--

UDA_RESET_RINGS:
             BISL2     #UDA_M_OWN,-             ; Set response ring to UDA own
                       @CPKFSL_RINGP(R0)
             CLRQ      (R2)                     ; Clear MSCP Command Reference Number
                                                ; And UBA Resources fields in list entry
             RSB ;++
; GET_END_PACKET - Routine to get the next available response packet from UDA
;
; Functional Description:
; /TBS/
;
; Inputs:
;       R1 = Address of Internal data structures
;
; Outputs:
;       R0 = Address of End packet or 0 if next packet belonged to UDA
;            or no command packet match was found.
;       R2 = Address of Active Command Packet with same reference number, or
;            undefined if no match was found
;--

GET_END_PACKET:
             MOVQ      R3,-(SP)                 ; Save R3 and R4
             MOVL      UDASL_BUFTOP(R1),R4      ; Get address of system buffer
5S:          MOVL      RESJSL_FLINK(R4),R0      ; Get address of next response packet
             BBS       #UDA_V_OWN,@CPKESL_RINGP(R0),20S ; Packet belongs to UDA
             BBS       #MSCPSV_OP_END,-         ; Process End Packet if flagged
                       MSCPSB_OPCODE(R0),10S
             BSBB      ATTENTION_MSG            ; Process attention message
             BRB       5S                       ; Try it again
10S:         REMQUE    @RFSQSL_FLINK(R4),R0     ; Remove packet from front of queue
             INSQUE    (R0),@RESJSL_BLINK(R4)   ; Insert in back of queue
             CLRL      R3                       ; Clear loop index
             MOVAB     ACTSL_CMD_LIST(R4),R2    ; Get address of first command packet
15S:         CMPL      CPKESL_CMD_REF(R2),-     ; Compare reference numbers between
                       MSCPSL_CMD_REF(R0)       ; response and command packets
             BEQL      25S                      ; Found the match
             ADDL2     #CPKESK_SIZE,R2          ; Point to next entry
             AOBLSS    #CPKFSK_LIST_LEN,R3,15S  ; Loop through all command packets
             BISL2     #UDA_M_OWN,@CPKESL_RINGP(R0) ; Set ring entry to UDA own
20S:         CLRL      R0                       ; Set no response packet available
25S:         MOVQ      (SP)+,R3                 ; Restore registers
             RSB                                ; Return to caller ;++
; ATTENTION_MSG - Attention Message Processing Routine
;
; Functional Description:
; If the message received is an Available Attention Message, then an On-Line
; internal MSCP packet is generated for the unit declared. The other forms of
; attention messages are currently ignored.
;
; Inputs:
;       R0 = Address of Message Packet
;       R1 = Address of Internal Data Structures
;--

ATTENTION_MSG:
             BLBC      UDASW_FLAGS(R1),2US      ; Ignor message if UDA went offline
             CMPB      #MSCPSK_OP_AVATN,MSCPSB_OPCODE(R0)
             BNEQ      2US                      ; Ignor non-available attn message
             MOVQ      R0,-(SP)                 ; Save input context
             BSBW      UDA_GET_INTPKT           ; Get a system buffer for internal pkt
             BLBC      R0,15S                   ; Allocation failure, ignor request
```

```
            MOVJ     (SP)+,R0                        ; Restore input context
            MOVW     MSCPSW_UNIT(R0),-               ; Load Unit Number
                     MSCPSW_UNIT(R2)
            MOVW     MSCPSW_UNIT(R0),-               ; From attention message packet
                     MSCPSW_SHOW_UNT(P2)             ; Load Shadow Unit Number
            MOVB     #MSCPSK_OP_ONLIN,-              ; Load online command
                     MSCPSB_OPCODE(R2)
10$:        MOVL     UDASL_INTPQUE(R1),R3            ; Get internal packet queue listhead
            ADDL2    S^#4,R3                         ; Get back link
            INSQUE   (R2),@(R3)                      ; Insert packet in rear of queue
            BRB      20$                             ; Clean up and return
15$:        MOVQ     (SP)+,R0                        ; Restore input context
20$:        REMQUE   @RESQSL_FLINK(R4),R0            ; Remove packet from front of queue
            INSQUE   (R0),@RESQSL_BLINK(R1)          ; Insert in back of queue
            BISL2    #UDA_M_OWN,@CPKESL_RINGP(R0)    ; Set ring entry to UDA Own
            RSB
            .PAGE
; ++
; GET_CMD_PACKET - Routine to get the next command packet for caller
;
; Functional Description:
; /TBS/
;
; Input:
;       R1 = Address of internal data structures
; Outputs:
;       R0 = Success = Address of empty command packet.
;       R0 = Failure = 0 if:
;               1) Own bit set indicating UDA owns packet
;               2) Own bit reset but flag bit set indicating
;                  packet is still active.
;       R2 = Address of empty Active MSCP Command packet entry
; --

GET_CMD_PACKET:
            PUSHL    R1                              ; Save R1
            MOVL     UDASL_CMD_LIST(R1),R2           ; Get address of command list
            MOVL     UDASL_BUFTOP(R1),R1             ; Get address of system buffer
            MOVL     CMDQSL_FLINK(R1),R0             ; Get address of next packet
            BBS      #UDA_V_OWN,@CPKESL_RINGP(R0),20$ ; Packet belongs to UDA
            CLRL     R1                              ; Init loop index
5$:         TSTL     (R2)                            ; Is this entry empty ?
            BEQL     10$                             ; Yes, use it
            ADDL2    S^#CPKESK_SIZE,R2               ; Bump pointer
            AOBLSS   #CPKESK_LIST_LEN,R1,5$          ; Loop
            BRB      20$                             ; Active list is full
10$:        CLRL     R1                              ; Init loop index
15$:        CLRL     MSCPSL_CMD_REF(R0)[R1]          ; Clear MSCP Packet for caller
            AOBLSS   #MSCPSK_PKTSIZE@-3,R1,15$
            POPL     R1                              ; Restore R1
            JSB      @(SP)+                          ; Execute co-routine call to caller ; Return here if command packet can be queued to the UDA PUSHL    R1                              ; Save R1
            MOVL     UDASL_BUFTOP(R1),R1             ; Get address of system buffer
            REMQUE   @CMDQSL_FLINK(R1),R0            ; Rotate packet from front of queue to
            INSQUE   (R0),@CMDQSL_BLINK(R1)          ; back of queue
            BICL2    #UDA_M_FLAG,-                   ; Clear flag bit in ring entry
                     @CPKESL_RINGP(R0)
            BISL2    #UDA_M_OWN,-                    ; Set packet to UDA own
                     @CPKESL_RINGP(R0)
20$:        CLRL     R0                              ; Set failure flag if here from above
            POPL     R1                              ; Restore R1
            RSB                                      ; Return to caller
            .PAGE
; ++
; UDA_GET_INTPKT - Allocate a system buffer for an internal MSCP packet
;
; Functional Description:
; Calls UDA_ALONONPAGED for the buffer. Clears the 48 bytes of packet
; to zeroes for caller, and loads next higher internal MSCP Packet
; command reference number.
;
; Inputs: none
;
; Outputs:
;       R0 = Success or failure as received from EXESALONUNPAGED
;       R1 = Address of internals if allocation succeeded else trash
;       R2 = Address of buffer
; --

UDA_GET_INTPKT:
            MOVL     #<MSCPSK_PKTSIZE+12>,R1         ; Define size of system buffer needed
            BSBB     UDA_ALONONPAGED                 ; Get system buffer
            BLBC     R0,15$                          ; Allocation failure, ignor request
            CLRL     R1                              ; Init loop index
5$:         CLRL     MSCPSL_CMD_REF(R2)[R1]          ; Clear Packet
            AOBLSS   #MSCPSK_PKTSIZE@-3,R1,5$
            MOVAB    UDASL_INTERNAL,R1               ; Get internal's address
10$:        INCW     UDASW_REF_NUM(R1)               ; Make a new command reference number
            BEQL     10$                             ; But not a zero
            MOVW     UDASW_REF_NUM(R1),-             ; Load packet's command reference no
                     MSCPSL_CMD_REF(R2)
15$:        RSB
            .PAGE
; ++
; UDA_ALONONPAGED - Allocate a buffer from system space for caller
;
```

```
; Functional Description:
; Calls FXESALONONPAGED and inserts buffer size and type in block if success.
; Saves R3 for caller. R3 usually contains the address of an IRP.
;
; Inputs:
;       R1 = Size of block
; Outputs:
;       R0 = low bit clear indicates failure
;       R0 = low bit set indicates success
;       R1 = Size of buffer
;       R2 = Address of buffer
;--

UDA_ALONONPAGED:
        PUSHR   #^M<R1,R3>                      ; Save R3 and requested buffer size
        JSB     G^EXESALONONPAGED               ; Request a system buffer
        POPR    #^M<R1,R3>                      ; Restore registers
        BLBC    R0,5S                           ; None available, return
        MOVW    R1,IRP$W_SIZE(R2)               ; Load size descriptor in buffer
        MOVZBW  #DYN$C_BUFIO,IRP$B_TYPE(R2)     ; Define type
5S:     RSB ;++
; UDA_DEANONPAGED - Deallocate a buffer from system space for caller.
;
; Functional Description:
; Calls FXESDEANONPAGED and saves R1-R3 for caller
;
; Inputs:
;       R0 = Address of buffer to be deallocated
; Outputs: None
;--

UDA_DEANONPAGED:
        PUSHR   #^M<R1,R2,R3>                   ; Save registers
        JSB     G^EXESDEANONPAGED               ; De-allocate system buffer
        POPR    #^M<R1,R2,R3>                   ; Restore registers
        RSB
        .PAGE
;++
; UDA_IOPOST - I/O post processing routine
;
; Functional Description:
; /TBS/
; Inputs:
;       R3 = Address of IRP to post process
;       R5 = Address of the ubiquitous Clone UCB
;       R7 = I/O status long word 1
;       R8 = I/O status long word 2
; Outputs: None
;--

UDA_IOPOST:
        MOVL    R0,-(SP)                        ; Save R0
        MOVQ    R7,IRP$L_MEDIA(R3)              ; Load final status in IRP
        DECL    UCB$L_OPCNT(R5)                 ; Account for I/O in Clone UCB
        MOVL    IRP$L_UCB(R3),R0                ; Get address of real UCB
        INCL    UCB$L_OPCNT(R0)                 ; Account for I/O in real UCB
        MOVAB   G^IOC$GL_PSBL,R0                ; Get address of iopost queue listhead
        INSQUE  (R3),@(R0)                      ; Insert IRP in post process queue
        BNEQ    10S                             ; Branch if not first entry
        SOFTINT #IPL$_IOPOST                    ; Initiate Software Interrupt
10S:    MOVL    (SP)+,R0                        ; Restore R0
        RSB ;++
; LINK_CLONE - Routine to link the Clone UCB at the end of the UCB list
;              for access by the timeout handler.
;
; Inputs:
;       R5 = Address of clone UCB
;
; Registers Used: R0,R2
;--

LINK_CLONE:
        MOVL    UCB$L_CRB(R5),R0                ; Get address of CRB
        MOVL    CRB$L_INTD+VEC$L_IDB(R0),R0     ; Get address of IDB
        MOVL    IDB$L_UCBLST(R0),R0             ; Get address of first UCB
5S:     MOVL    UCB$L_LINK(R0),R2               ; Get link to next UCB from this UCB
        BEQL    10S                             ; This one was the last
        MOVL    R2,R0                           ; Load address of next UCB
        BRB     5S                              ; Continue search for last in list
10S:    MOVL    R5,UCB$L_LINK(R0)               ; Link former last UCB to clone
        MOVL    R0,UCB$L_DEVDEPEND(R5)          ; Load back pointer in Clone
        CLRL    UCB$L_LINK(R5)                  ; Set clone to last
        CLRL    UCB$L_FPC(R5)                   ; Clear fork PC field
        RSB                                     ; Return to caller ; All good things must come to an end
UDA_END:
        .END
```

What is claimed is:

1. In a data processing system which includes first and second processors (70 and 31), a memory (80) to which information can be written by each of said processors and from which information can be read by each of said processors, such memory having a plurality of locations for storing said information, and bus means (60) for interconnecting the first and second processors and said memory, to enable communications therebetween, said bus means being of the type which has no hardware interlock capability which is usable by the other of said processors to selectively prevent the other of said processors from accessing said memory locations, the improvement comprising:
- communications control means for controlling communications between said processors and permitting the first processor to send a plurality of commands in sequence to the second processor via the bus means, and for permitting the second processor to send responses to those commands to the first processor via the bus means;
- the communications control means including a plurality of locations in said memory, termed interface memory locations, adapted to serve as a communications interface between the first and second processors, all commands and responses being transmitted through such interface memory locations;
- the interface memory locations comprising a pair of ring buffers;
- a first one of said ring buffers being adapted to buffer the transmission of messages issued by the first processor and a second one of said ring buffers being adapted to buffer the reception of messages transmitted by the second processor;
- each of said ring buffers including a plurality of memory locations adapted to receive from an associated one of said processors a descriptor signifying another location in said memory;
- for said first ring buffer, the location signified by such descriptor being a location containing a message for transmission to the second processor;
- for said second ring buffer, the location signified by such descriptor being a location for holding a message from the second processor; and
- the communications control means permitting each of said processors to operate at its own rate, independent of the other of said processors, and to access a ring buffer for writing thereto only when the buffer does not contain information previously written to such buffer but not yet read from it and for reading to such buffer only when the buffer contains information written to it but not yet read therefrom, thus preventing race conditions from developing across said bus means in relation to accessing the interface memory locations.

2. The apparatus of claim 1 wherein there is associated with each ring buffer entry a bit whose state indicates the status of that entry;
- for each entry of the first ring buffer, the first processor being adapted to place such entry's ownership bit in a predetermined first state when a descriptor is written into said entry, and the second processor being adapted to cause the state of the ownership bit to change when such descriptor is read from said entry;
- for each entry of the second ring buffer, the second processor being adapted to place such entry's ownership bit in a predetermined first state when a descriptor is written into said entry, and the first processor being adapted to cause the state of the ownership bit to change when such descriptor is read from said entry;
- the first and second processors being adapted to read ring buffer entries in sequence and to read each ring buffer entry only when the ownership bit of said entry is in said predetermined first state, whereby an entry may not be read twice and an entry may not be read before a descriptor is written thereto.

3. The data processing system of claim 1 wherein the communications control means is further adapted to provide such communications while each of the processors is permitted to operate at its own rate, independent of the other processor, and while avoiding processor interruption for a multiplicity of read and write operations.

4. In a data processing system which includes first and second processors (70 and 31), a memory (80) adapted to be used by said processors for containing information to be shared by the processors, and bus means (60) for interconnecting the first and second processors and the memory, the bus means (60) being of the type which has no hardware interlock capability which is usable by each of said processors to selectively prevent the other of said processors from accessing at least a portion of said memory, the improvement comprising:
- the first and second processors (70 and 31) being adapted to employ a portion (80A) of said memory as a communications region accessible by both of said processors, so that all commands and responses can be transmitted from one of said processors to the other of said processors through such portion of memory;
- the communications region of memory including a pair of ring buffers (80D and 80E);
- a first one of said ring buffers (80D) buffering the transmission of messages issued by the first processor (70) and a second one of said ring buffers (80E) buffering the reception of messages transmitted by the second processor (31);
- each of said ring buffers including a plurality of memory locations (e.g., 132, 134, 136 and 138) adapted to receive from the associated transmitting one of said processors a descriptor signifying another location in said memory;
- for said first ring buffer, the location signified by such descriptor being a location containing a message for transmission to the second processor;
- for said second ring buffer, the location signified by such descriptor being a location for storing, at least temporarily, a message from the second processor; and
- the first and second processors (70 and 31) further being adapted to control access to said communications region (80A) such that information written therein by one of said processors may not be read twice by the other processor and a location where information is to be written by one of the processors may not be read by the other processor before said information has been written,
- so that race conditions are prevented from developing across said bus means in the course of interprocessor communications, and messages are transmitted from said ring buffers in the same sequence as that in which they are issued by the processors, while each of the processors is permitted to operate at its own rate, with substantial independence from the other processor.

5. The apparatus of claim 4 wherein said ring buffers are adapted to permit the first processor to send a plurality of commands in sequence to the second processor via the bus means, and to permit the second processor to send responses to those commands to the first processor via the bus means.

6. The apparatus of claim 5 wherein the first processor (70) is a host computer's (1) central processor, the second processor (31) is a processor in a controller (2, 30) for a secondary storage device (40), and the bus means includes an input/output bus (60) for interconnecting said host computer with said secondary storage device.

7. The apparatus of claim 5 wherein there is associated with each ring buffer entry a byte of at least one bit, termed the ownership byte (FIG. 3B-133, 135, 137, 139; FIG. 8-278), whose state indicates the status of that entry;
   for each entry of the first ring buffer (80D), the first processor (70) being adapted to place such entry's ownership byte in a predetermined first state when a descriptor is written into said entry, and the second processor (31) being adapted to cause the state of the ownership byte to change when such descriptor is read from said entry;
   for each entry of the second ring buffer (80E), the second processor (31) being adapted to a place such entry's ownership byte in a predetermined first state when a descriptor is written into said entry, and the first processor (70) being adapted to cause the state of the ownership byte to change when such descriptor is read from said entry;
   the first and second processors being adapted to read ring buffer entries in sequence and to read each ring buffer entry only when the ownership byte of said entry is in said predetermined first state, whereby an entry may not be read twice and an entry may not be read before a descriptor is written thereto.

8. The apparatus of claim 7 wherein said ownership byte (278) is the most significant bit in each descriptor (260, 264).

9. The apparatus of claim 5 wherein the controller (2, 30) further includes pointer means (32, 34) for keeping track of the current first and second ring buffer entries.

10. The apparatus of claim 5 further including means for limiting the generation of processor interrupt requests to the first processor in connection with the sending of commands and receipt of responses by said processor, such that interrupt requests to said processor are generated substantially only when an empty ring buffer becomes not-empty and when a full ring buffer becomes not-full.

11. The apparatus of claim 10 wherein the size of each ring buffer is communicated by said first processor to the second processor at the time of initializing a communications path betweem them.

12. The apparatus of claim 11 wherein the processors (70, 31) communicate by sending message packets to each other, and further including:
   the first ring buffer (80D) being adapted to hold up to M commands to be executed;
   an input/output device class driver (3) associated with the first processor (70) for sending commands to and receiving responses from an input/output device (40);
   the second processor (31) being adapted to provide to the class driver (3) in its first response packet the number M of commands of a predetermined length which said buffer can hold;
   the class driver being adapted to maintain a credit account having a credit account balance indicative of the number of commands the buffer can accept at any instant;
   the credit account balance initially being set to equal M and being decremented by one each time the class driver issues a command and being incremented by the value;
   the second processor further being adapted to provide to the class driver, with each response packet, a credit value (FIG. 9, 288) representing the number of commands executed to evoke the response;
   the class driver incrementing the credit account balance by said credit value; and
   the first processor and class driver being adapted so as not to issue any commands when the credit account balance is zero and further being adapted to issue only commands which are immediately executed when the credit account balance is one.

13. In a data processing system which includes first and second processors, (70 and 31) a memory (80) adapted to be used by said processors, and bus means (60, 110, 90) for interconnecting the first and second processors and memory to enable communications therebetween, said bus means being of the type which has no hardware interlock capability which is usable by each of said processors to selectively prevent the other of said processors from accessing at least a portion of said memory, the improvement comprising:
   at least a portion (80A) of said memory (80) being adapted to serve as a communications region accessible by both of said processors all commands and responses being transmitted from one processor to the other through such portion of memory;
   means (278) for controlling access to information in said communications region whereby information written therein by one of said processors may not be read twice by the other processor and wherein a location where information is to be written by one of the processors may not be read by the other processor before said information has been written;
   the communications region of memory including a pair of ring buffers (80D, 80E);
   a first one of said ring buffers (80D) being adapted to buffer the transmission of messages issued by the first processor and a second one of said ring buffers (80E) being adapted to buffer the reception of messages transmitted by the second processor;
   each of said ring buffers including a plurality of memory locations (e.g., FIG. 3B-132, 134, 136, 138) adapted to receive from an associated one of said processors a descriptor (260, 264) signifying another location in said memory;
   for said first ring buffer, the location signified by such descriptor being a location containing a message for transmission to the second processor; and
   for said second ring buffer, the location signified by such descriptor being a location for holding a message from the second processor,
   so that race conditions are prevented from developing across said bus means and messages are transmitted from said ring buffers in the same sequence as that in which they are issued by the processors, while each of the processors is permitted to operate at its own rate, independent of the other processor.

14. The apparatus of claim 13 wherein said ring buffers are adapted to permit the first processor to send a plurality of commands in sequence to the second processor via the bus means, and to permit the second processor to send responses to those commands to the first processor via the bus means.

15. The apparatus of claim 14 wherein the first processor is a host computer's (1) central processor (70), the second processor is a processor (31) in a controller (2, 30) for a secondary storage device (40), and the bus means includes an input/output bus (60) for interconnecting said host computer with said secondary storage device.

16. The apparatus of claim 15 wherein there is associated with each ring buffer entry a byte of at least one bit, termed the ownership byte (FIG. 3B-133, 135, 137, 139; FIG. 8, 278), whose state indicates the status of that entry;
  for each entry of the first ring buffer (80D), the first processor (70) being adapted to place such entry's ownership byte in a predetermined first state when a descriptor (260, 264) is written into said entry, and the second processor (31) being adapted to cause the state of the ownership byte to change when such descriptor is read from said entry;
  for each entry of the second ring buffer (80E), the second processor (31) being adapted to place such entry's ownership byte in a predetermined first state when a descriptor is written into said entry, and the first processor (70) being adapted to cause the state of the ownership byte to change when such descriptor is read from said entry;
  the first and second processors being adapted to read ring buffer entries in sequence and to read each ring buffer entry only when the ownership byte of said entry is in said predetermined first state, whereby an entry may not be read twice and an entry may not be read before a descriptor is written thereto.

17. The apparatus of claim 15 wherein the controller further includes pointer means (32, 34) for keeping track of the current first and second ring buffer entries.

18. The apparatus of claim 15 further including means for reducing the generation of processor interrupt requests to the first processor in the sending of commands thereby and responses thereto, such that interrupt requests to said processor are generated substantially only when an empty ring buffer becomes non-empty and when a full ring buffer becomes not full.

19. The apparatus of claim 18 wherein the size of each ring buffer is communicated by said first processor to the other of said processors at the time of initializing the communications path between them.

20. The apparatus of claim 19 wherein the processors communicate by sending message packets to each other, and further including:
  a buffer associated with the second processor for holding up to M commands to be executed;
  an input/output device class driver associated with the first processor for sending commands to and receiving responses from an input/output device;
  the second processor being adapted to provide to the class driver in its first response packet the number M of commands of a predetermined length which said buffer can hold;
  the class driver being adapted to maintain a credit account having a credit account balance indicative of the number of commands the buffer can accept at any instant;
  the credit account balance initially being set to equal M and being decremented by one each time the class driver issues a command and being incremented by the value;
  the second processor further being adapted to provide to the class driver, with each response packet, a credit value representing the number of commands executed to evoke the response;
  the class driver incrementing the credit account balance by said credit value; and
  the first processor and class driver being adapted so as not to issue any commands when the credit account balance is zero and further being adapted to issue only commands which are immediately executed when the credit account balance is one.

21. The apparatus of claim 16 wherein said ownership byte is the most significant bit in each descriptor.

* * * * *